(12) United States Patent
Lee et al.

(10) Patent No.: US 9,864,703 B2
(45) Date of Patent: Jan. 9, 2018

(54) CACHE MEMORY HAVING ENHANCED PERFORMANCE AND SECURITY FEATURES

(71) Applicant: Teleputers, LLC, Princeton, NJ (US)

(72) Inventors: Ruby B. Lee, Princeton, NJ (US); Zhenghong Wang, San Jose, CA (US)

(73) Assignee: Teleputers, LLC, Princeton, NJ (US)

( * ) Notice: Subject to any disclaimer, the term of this patent is extended or adjusted under 35 U.S.C. 154(b) by 0 days.

(21) Appl. No.: 14/827,958

(22) Filed: Aug. 17, 2015

(65) Prior Publication Data
US 2015/0356026 A1    Dec. 10, 2015

Related U.S. Application Data

(62) Division of application No. 14/039,223, filed on Sep. 27, 2013, now Pat. No. 9,110,816, which is a division
(Continued)

(51) Int. Cl.
*G06F 12/08*     (2016.01)
*G06F 12/128*    (2016.01)
(Continued)

(52) U.S. Cl.
CPC ........ *G06F 12/128* (2013.01); *G06F 12/0802* (2013.01); *G06F 12/0846* (2013.01);
(Continued)

(58) Field of Classification Search
CPC .. G06F 12/0802; G06F 12/0891; G06F 12/12; G06F 12/0811; G06F 12/0846
(Continued)

(56) References Cited

U.S. PATENT DOCUMENTS 5,717,648 A * 2/1998 Davis et al. ............. 365/230.06
5,822,760 A * 10/1998 Yoshizawa et al. .......... 711/137
(Continued)

OTHER PUBLICATIONS

Wang, et al., "New Cache Designs for Thwarting Software Cache-Based Side Channel Attacks," Proceedings of the 34th Annual International Symposium on Computer Architecture, San Diego, CA, ACM Jun. 9-13, 2007 (12 pages).*
(Continued)

*Primary Examiner* — Than Nguyen
(74) *Attorney, Agent, or Firm* — McCarter & English, LLP

(57) ABSTRACT

A cache memory having enhanced performance and security feature is provided. The cache memory includes a data array storing a plurality of data elements, a tag array storing a plurality of tags corresponding to the plurality of data elements, and an address decoder which permits dynamic memory-to-cache mapping to provide enhanced security of the data elements, as well as enhanced performance. The address decoder receives a context identifier and a plurality of index bits of an address passed to the cache memory, and determines whether a matching value in a line number register exists. The line number registers allow for dynamic memory-to-cache mapping, and their contents can be modified as desired. Methods for accessing and replacing data in a cache memory are also provided, wherein a plurality of index bits and a plurality of tag bits at the cache memory are received. The plurality of index bits are processed to determine whether a matching index exists in the cache memory and the plurality of tag bits are processed to determine whether a matching tag exists in the cache memory, and a data line is retrieved from the cache memory if both a matching tag and a matching index exist in the cache memory. A random line in the cache memory can be replaced with a data line from a main memory, or evicted
(Continued)

without replacement, based on the combination of index and tag misses, security contexts and protection bits. User-defined and/or vendor-defined replacement procedures can be utilized to replace data lines in the cache memory.

14 Claims, 16 Drawing Sheets

Related U.S. Application Data of application No. 12/633,500, filed on Dec. 8, 2009, now Pat. No. 8,549,208.

(60) Provisional application No. 61/201,185, filed on Dec. 8, 2008.

(51) Int. Cl.
*G06F 12/0802* (2016.01)
*G06F 12/0846* (2016.01)
*G06F 12/0891* (2016.01)
*G06F 12/0811* (2016.01)
*G06F 12/0864* (2016.01)

(52) U.S. Cl.
CPC ...... *G06F 12/0891* (2013.01); *G06F 12/0811* (2013.01); *G06F 12/0864* (2013.01); *G06F 2212/1021* (2013.01); *Y02B 60/1225* (2013.01)

(58) Field of Classification Search
USPC .............................. 711/3, 118, 133
See application file for complete search history.

(56) References Cited

U.S. PATENT DOCUMENTS

| | | | |
|---|---|---|---|
| 8,549,208 | B2 | 10/2013 | Lee et al. |
| 9,110,816 | B2 | 8/2015 | Lee et al. |
| 2004/0181626 | A1 | 9/2004 | Pickett |
| 2006/0112235 | A1 | 5/2006 | Cabot et al. |
| 2006/0253666 | A1* | 11/2006 | Flautner et al. .............. 711/156 |
| 2010/0001873 | A1 | 1/2010 | Johnson et al. |
| 2010/0180083 | A1 | 7/2010 | Lee et al. |
| 2010/0312957 | A1 | 12/2010 | Ramaraju et al. |
| 2014/0095797 | A1 | 4/2014 | Lee et al. |

OTHER PUBLICATIONS

Wang, et al., "A Novel Cache Architecture with Enhanced Performance and Security," Proceedings of the 41st Annual IEEE/ACM International Symposium on Microarchitecture (Micro-41), Nov. 8-12, 2008 (11 pages).
Page, "Partitioned Cache Architecture as a Side-Channel Defence Mechanism," Cryptology ePrint Archive, Report 2005/280, 2005 (14 pages).
Bernstein, "Cache-Timing Attacks on AES," http://cr.yp.to/antiforgery/cachetiming-20050414.pdf (2005) (37 pages).
Percival, "Cache Missing for Fun and Profit," www.daemonology.net/papers/htt.pdf (2004) (13 pages).
Osvik, et al., "Cache Attacks and Countermeasures: the Case of AES," Cryptology ePrint Archive, Report 2005/271, 2005 (25 pages).
Aciicmez, et al., "Cache Based Remote Timing Attack on th AES," RSA Conference 2007, Cryptographers' Track (16 pages).
Bonneau, et al., "Cache-Collision Timing Attacks Against AES," Cryptographic Hardware and Embedded Systems—CHES 2006 (15 pages).
Aciicmez, et al., "Trace-Driven Cache Attacks on AES," IACR Cryptology ePrint Archive, Report 2006/138, Apr. 2006 (17 pages).
Brickell, et al., "Software Mitigations to Hedge AES Against Cache-Based Software Side Channel Vulnerabilities," IACR ePrint Archive, Report 2006/052, Feb. 2006 (17 pages).
Thoziyoor, et al., "CACTI 5.0," PHL Technical Report HPL-2007-167, Oct. 19, 2007 (82 pages).
Shirvani, et al., "PaDded Cache: A New Fault-Tolerance Techniquie for Cache Memories," 17th IEEE VLSI Test Symposium, 1999 (6 pages).
Mutyam, et al., "Working With Process Variation Aware Caches," In Proceedings of the Conference on Design, Automation and Test in Europe, 2007 (6 pages).
Lee, et al., "Performance of Graceful Degradation for Cache Faults," In Proceedings of the IEEE Computer Society Annual Symposium on VLSI, 2007 (7 pages).
Zhang, et al., "Highly-Associative Caches for Low-Power Processors," Kook Chips Workshop, 33rd International Symposium on Microarchitecture, Montery, CA, Dec. 2000 (6 pages).
Zhang, "Balanced Cache: Reducing Conflict Misses of Direct-Mapped Caches through Programmable Decoders," Proceedings of the 33rd International Symposium on Computer Architecture, 2006 (12 pages).
"Predictive Technology Model," printout from http://www.eas.asu.edu/about.ptm, website Copyright 2007, last updated Nov. 15, 2008 (3 pages).
Jouppi, "Improving Direct-Mapped Cache Performance by the Addition of a Small Fully-Associative Cache and Prefetch Buffers," Proceedings of the 17th Annual International Symposium on Computer Architecture, 1990 (10 pages).
Peir, et al., "Capturing Dynamic Memory Reference Behavior with Adaptive Cache Topology," ASPLOS-VIII, 1998 (11 pages).
Powell, et al., "Reducing Set-Associative Cache Energy Via Way-Prediction and Selective Direct-Mapping," Proceedings of the 34th Annual ACM/IEEE International Symposium on Microarchitecture, 2001 (12 pages).
Inoue, et al., "Way-Predicting Set-Associative Cache for High Performance and Low Energy Consumption," Proceedings of the 1999 International Symposium on Low Power Electronics and Design, 1999 (3 pages).
"SimpleScalar LLC—to Serve and Protect," printout from http://www.simplescalarcom, website Copyright 2004 (7 pages).
Al-Zoubi, et al., "Performance Evaluation of Cache Replacement Policies for the SPEC CPU2000 Benchmark Suite," Proceedings of the 42nd Annual Southeast Regional Conference, 2004 (6 pages).
Fischer, et al., "True Random Number Generator Embedded in Reconfigurable Hardware," 4th International Workshop on Cryptographic Hardware and Embedded Systems, 2002 (16 pages).
Ranganathan, et al., "Reconfigurable Caches and Their Application to Media Processing," Proceedings of the 27th International Symposium on Computer Architecture (ISCA-27), Jun. 2000 (11 pages).
Notice of Allowance dated Apr. 13, 2015, issued in connection with U.S. Appl. No. 14/039,223 (7 pages).
Office Action dated Sep. 3, 2014, issued in connection with U.S. Appl. No. 14/039,223 (10 pages).
Notice of Allowance dated Jul. 10, 2013, issued in connection with U.S. Appl. No. 12/633,500 (8 pages).
Office Action dated Nov. 13, 2012, issued in connection with U.S. Appl. No. 12/633,500 (11 pages).

* cited by examiner

CACHE MEMORY HAVING ENHANCED PERFORMANCE AND SECURITY FEATURES

RELATED APPLICATIONS

This application is a divisional of, and claims the benefit of priority to, U.S. patent application Ser. No. 14/039,223 filed on Sep. 27, 2013, which is a divisional of, and claims the benefit of priority to, U.S. patent application Ser. No. 12/633,500 filed on Dec. 8, 2009, now U.S. Pat. No. 8,549,208 issued on Oct. 1, 2013, which claims the benefit of U.S. Provisional Application Ser. No. 61/201,185 filed Dec. 8, 2008, the entire disclosures of which are expressly incorporated herein by reference.

STATEMENT OF GOVERNMENT INTERESTS

The present invention was made with support of the U.S. Government under NSF and DARPA Grant Nos. CNS-0430487 and CNS-0752961. Accordingly, the U.S. Government has certain rights in the present invention.

BACKGROUND OF THE INVENTION

Field of the Invention

The present invention relates to computer memory. More specifically, the present invention relates to a cache memory having enhanced performance and security features.

Related Art

Cache memory is an important component of modern computer processors. Typically, cache memory is manufactured from high-speed memory and is provided on the same chip as a microprocessor. To alleviate processor delays associated with having to obtain information from main memory (which is slower than cache memory), modern cache memories store copies of frequently-accessed information from main memory, so that such information can be quickly retrieved from the cache memory. If a desired piece of information exists in the cache memory, a "hit" is said to have occurred; otherwise, a "miss" occurs, and the processor obtains the desired information from main memory.

Ideally, cache memories should have both short access times and low miss rates to minimize average memory access delay. Unfortunately, cache memories which achieve the best access times, such as direct-mapped (DM) cache memories, suffer from high miss rates. Fully associative (FA) or set-associative (SA) cache memories achieve the best miss-rates, but at the cost of increased access times and power consumption.

Power efficiency is also a critical issue in cache memory design. Lower power dissipation provides the benefits of longer battery life for mobile devices and reduced wear of the memory. Higher power consumption causes heating and reliability problems, which limit performance. Increasing faults and "hot spots" are also concerns—especially in the deep-submicron era of modern microprocessors. Due to the shrinking of technology feature sizes, process variations increase the number of faulty devices with excessive delay or leakage power. Also, current densities become higher, thereby unduly heating the chip and causing hot spots. Both of these outcomes adversely impact chip yields and device lifetimes.

Another new and important aspect for cache memory design is security. Recent software cache-based, side-channel attacks show that cache memories are highly vulnerable to leakage of critical information such as cryptographic keys. They rely only on the timing difference between cache hits and misses, and therefore are effective on all caches, impacting a wide range of platforms and users. Since security solutions often lead to very restrictive design, they typically result in severe performance degradation.

Recent attacks have shown that, in spite of software protections such as address space isolation or secure Virtual Machines, hardware caches in processors introduce interference between programs and users. For example, a given process can evict cache lines of other processes, causing them to miss cache accesses. As demonstrated by the recent cache-based side channel attacks, critical information (e.g., cryptographic keys) can easily be leaked out due to the aforementioned cache behavior. In contrast to traditional cryptanalysis, these cache-based attacks allow the recovery of the full secret cryptographic key and require much less time and computation power. Furthermore, these attacks can succeed on almost all processors with caches, since they rely only on hits and misses that occur in all caches. Such attacks are also very easy to launch: a remote computer user can become an attacker without the need for special equipment.

Both software and hardware techniques have been proposed to mitigate the information leakage problem in caches. Software techniques mostly involve rewriting the code to prevent known attacks from succeeding. One software solution is to avoid using memory access operations (e.g., replacing Advanced Encryption Standard (AES) table lookups with arithmetic and logical operations). The performance overhead, however, can be very high, and the method is not applicable to all situations. Another software countermeasure preloads objects into the cache before any use of them, so that all subsequent accesses achieve cache hits, thus leaking no information. This approach, however is not really secure since the preloaded objects could be evicted by other memory references at a later time. Researchers have also proposed using alternative tables, table permutation, and algorithmic masking to mitigate cache-based attacks. Such methods, however, can lead to significant performance degradation, e.g., delays of approximately 2 to 4 times slower in the case of AES. In general, software countermeasures incur significant performance degradation, and are often not secure enough due to the behavior of the underlying hardware cache. Software methods, alone, are not sufficient to provide secure yet high performance mitigation of cache-based information leakage.

Hardware methods have also been proposed. Cache partitioning ("Partitioned" cache) and cache line locking ("PL-cache") prevent undesirable cache evictions if the objects are put into a private partition or locked in cache, respectively, thus helping to achieve constant execution time. Another approach uses a randomization-based approach, allowing interference but randomizing it so that it carries no information. The drawback of cache partitioning and cache line locking is cache under-utilization. Cache lines that are locked or belong to a private partition cannot be used by other processes, even when they are unused. The randomization-based approach can avoid cache underutilization.

In summary, the information leakage problem in caches introduces a new challenge in cache design. In addition to performance, power efficiency, reliability, etc., cache designers have to also take security into account, which typically introduces even more restrictions in cache design and compromises other design goals.

SUMMARY OF THE INVENTION

The present invention relates to a cache memory having enhanced performance and security features. The cache memory includes a data array storing a plurality of data lines, a tag array storing a plurality of tags corresponding to the plurality of data lines, and an address decoder which permits dynamic memory-to-cache mapping to provide enhanced security of the data lines, as well as enhanced performance. The address decoder receives a context identifier and a plurality of index bits of an address passed to the cache memory, and determines whether a matching value in a line number register exists. The line number registers allow for dynamic memory-to-cache mapping, and their contents can be modified as desired by cache replacement algorithms disclosed herein. If a line number register with a matching value for the index bits and context identifier exists, a corresponding tag element from the cache tag memory is accessed and compared to the tag bits also in the address provided to the cache memory. At the same time, a corresponding data line from the cache data memory is accessed. If the tag element matches the tag bits in the address provided to the tag memory, then the corresponding data line accessed from the data array is transmitted to a processor in communication with the cache that requested a data element contained in the data line, for subsequent use by the processor. If both a matching line number register and a matching tag element are not found, the present invention also provides a method and a computer-readable medium for replacing data in a faster and smaller cache memory, with data from a larger and slower memory. A random line in the faster and smaller cache memory can be replaced with a data line from the larger and slower memory. Under other conditions, a random line in the cache can be evicted without replacing it with a data line from the larger and slower memory. User-defined and/or vendor-defined replacement procedures can also be utilized to replace data lines in the cache memory. A circuit implementation for an address decoder that is an embodiment of the present invention is also described herein.

BRIEF DESCRIPTION OF THE DRAWINGS

The foregoing features of the invention will be apparent from the following Detailed Description of the Invention, taken in connection with the accompanying drawings, in which.

DETAILED DESCRIPTION OF THE INVENTION

The present invention relates to a cache memory, as discussed in detail below in connection with FIGS. 1-12.

Figure 1:
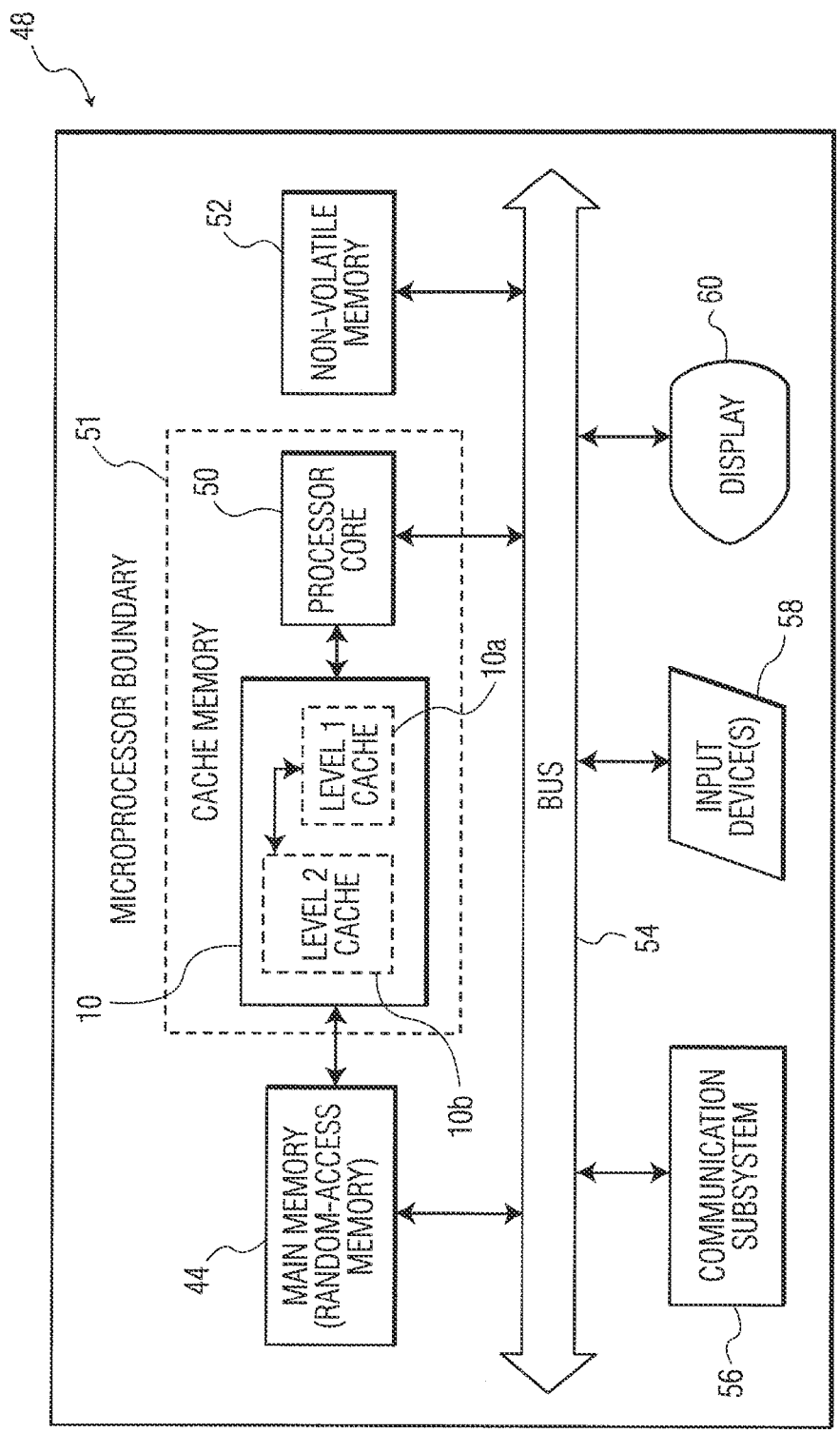
FIG. 1 is a block diagram showing the cache memory of the present invention, implemented in a computer system.

FIG. 1 is a block diagram showing the cache memory 10 of the present invention, implemented in a computer system 48. As discussed below in greater detail, the cache memory 10 allows for dynamic mapping of contents from a main memory 44, so as to provide enhanced security and performance. The cache memory 10 could include a single type of cache memory, or two types of cache memory, such as level 1 cache memory 10a and level 2 cache memory 10b, as shown in FIG. 1. The cache memory 10 communicates with the main memory 44 and a processor core 50. As in many modern microprocessors, the processor core 50 and the cache memory 10 could be provided in the same processor chip; that is, within the boundary 51 of the microprocessor chip. Also, the cache memory 10 could be external to such a microprocessor chip, and in communication therewith.

The computer system 48 could be any suitable computer system, including, but not limited to, a desktop computer, laptop computer, handheld computer, personal digital assistant, portable computer, server, web server, proxy server, embedded computing system, etc. Such a system 48 could include a non-volatile memory 52 (e.g., disk, EPROM, EEPROM, flash memory, ROM, etc.), a bus 54 for allowing communication between components of the system 48, a random-access (main) memory 44 (e.g., dynamic RAM (DRAM)), a communications subsystem 56 (e.g., Ethernet network interface, wireless network interface, etc.), one or more input devices 58 (e.g., mouse, keyboard, etc.), and a display 60. It is noted that the components and arrangement shown in FIG. 1 could vary as dictated by the specific computer architecture in which the cache memory 10 is implemented.

Figure 2:
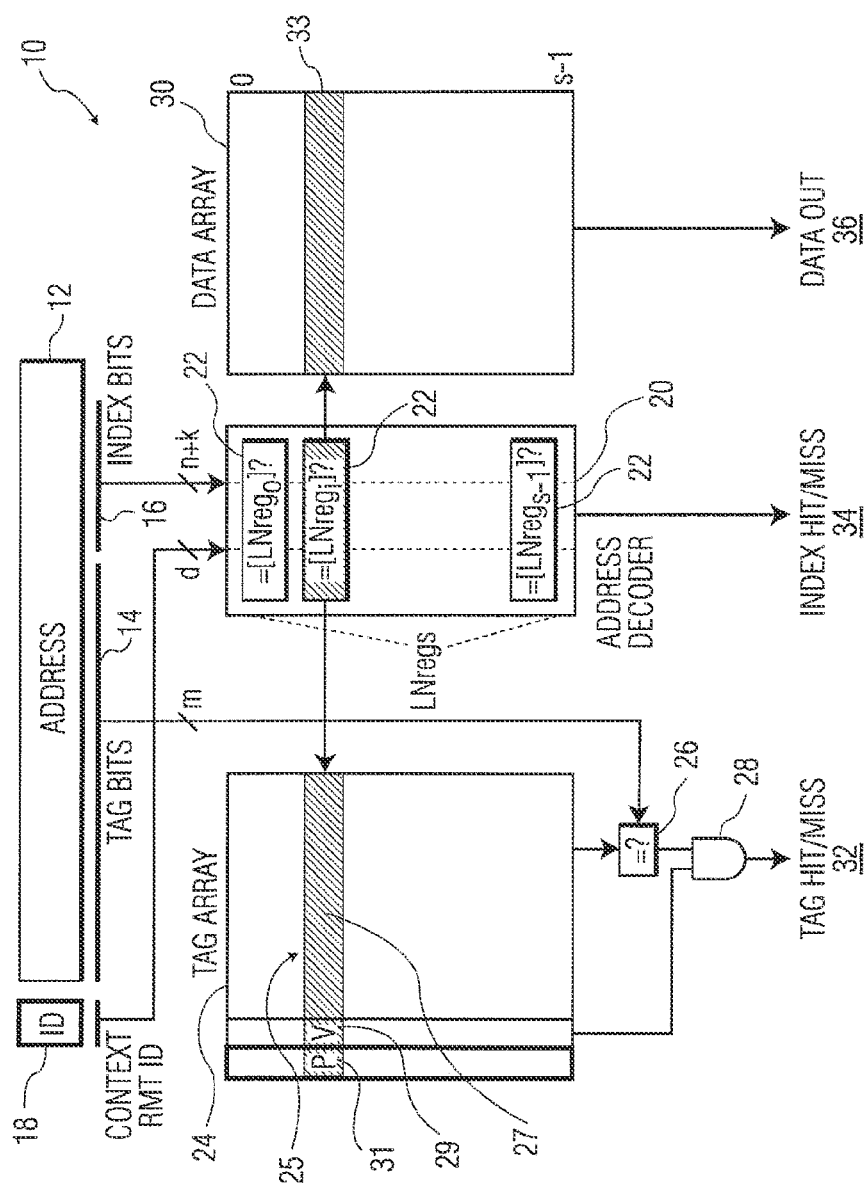
FIG. 2 is block diagram of the cache memory according to the present invention.

FIG. 2 is block diagram of the cache memory according to the present invention, indicated generally as 10. For clarity in the following description, we refer to only one level of cache memory, the Level-1 cache 10b that is closest to the processor core, within the cache memory 10. The cache memory 10 functions similarly to a conventional, direct-mapped cache memory, but also includes the novel ability to dynamically re-map cache memory contents so as to provide increased security of data stored in the cache memory 10. As in a conventional, direct-mapped cache memory, the cache memory 10 includes a tag array 24 which stores a plurality of tags (identifiers), and a data array 30 that stores a plurality of data lines. By the term data "lines," it is meant a single line of multiple data words, each data word consisting of multiple data bits. The cache memory 10 takes as input an address 12 which includes m tag bits 14 and n+k index bits 16, as well as a context identifier (context RMT_ID) 18 of d bits in length, m, n, k, and d being integers. Unlike traditional, direct-mapped cache memories (which provide n index bits) the cache memory 10 provides a larger number (n+k) of index bits. Conceptually, this is equivalent to mapping the memory space of the cache memory 10 to a larger, logical, direct-mapped (LDM) cache with $2^{n+k}$ lines. Such a conceptual LDM cache is discussed in greater detail below in connection with FIG. 3.

As shown in FIG. 2, an address decoder 20 is provided, which receives as inputs the context identifier (context RMT_ID) 18 as well as the index bits 16. The context RMT_ID 18 and the index bits 16 are used by the decoder 20 to look up the index of a real cache line to which the tag bits 14 may be mapped, by referring to a plurality of line number registers ("LNregs") 22 stored in a memory associated with (or forming part of) the decoder 20 (such as an index array), or which are hardwired registers as part of the decoder 20. As discussed below in greater detail below in connection with FIG. 3, the LNregs 22 are physical implementations of a plurality of logical re-mapping tables ("RMTs"), which can be altered as desired to provide security for the cache memory 10. In this arrangement, the cache memory 10 provides dynamic memory-to-cache remapping, meaning that a memory block can be mapped to any desired cache line at run time. This provides for improved security, for instance, from information leakage attacks and other security threats. By changing the contents of an RMT entry (i.e., by changing the contents of LNregs 22), an address can be remapped to an arbitrary cache line, thus securing the contents of the cache from information leakage attacks, as well as other security threats.

The address decoder 20 generates an output 34 which indicates whether an index hit or index miss has occurred, i.e., whether a matching index exists in the LNregs 22 which matches the index bits 16 and the context RMT_ID 18. If an index hit occurs, then the contents of the matching LNreg selects a corresponding tag element 25 from the tag array 24 and a corresponding data line 33.

The cache memory 10 also includes a tag comparator circuit which includes a comparator 26 and AND gate 28, for determining whether the selected tag element 25 in the tag array 24 matches the tag bits 14. The selected tag element 25 contains a tag value 27, a "V" flag bit 29 and a "P" flag bit 31. The flag bit "V" 29 indicates if the corresponding tag value is valid, i.e., whether the tag element 25 contains a valid tag value. If V=1 and, there is a match in the selected tag element 27 with the tag bits 14, then a tag hit is said to have occurred. Thus, a tag hit or a tag miss signal can be provided at the output 32.

Further, the data array 30 generates a data output 36, which represents data corresponding to the specified address 12, if there is both an index hit and a tag hit. That is, the data output 36 represents data which exists in the cache 10 and can be obtained therefrom, thereby obviating the need for a processor core to obtain such data from main memory.

The "P" flag bit 31 (an optional feature) indicates the presence of protected cache lines. In such circumstances, each page table entry (and/or segment descriptor, if implemented) could also have a PP flag bit, which indicates the presence of a protected page.

Figure 3:
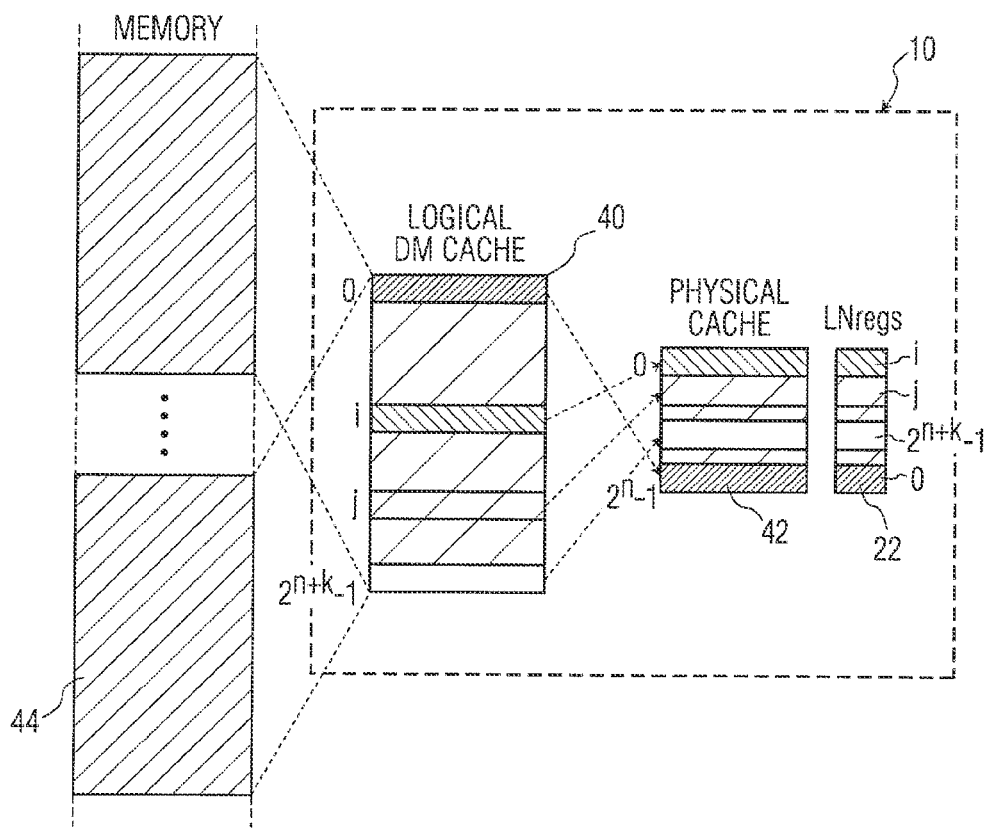
FIG. 3 is a diagram showing memory mapping performed by the cache memory of the present invention.

FIG. 3 is a diagram showing memory mapping performed by the cache memory 10 of the present invention. As discussed herein, a given context RMT_ID is assumed. The cache memory 10 stores selected lines of memory from a main memory. The dynamic remapping feature, as mentioned above, of the present invention can be thought of as equivalent to two logical mapping steps: (1) mapping the memory line to a line in a logical, direct-mapped (LDM) cache 40 and then (2) mapping the lines in the LDM to the physical cache 42.

In the first logical mapping step (1), every memory line with the same n+k index bits are mapped into the same LDM cache slot. However, since only one memory line can reside in this LDM cache slot at any one time, the particular line residing here is indicated by the tag 27 shown in FIG. 2 in the selected tag element 25. This is like a direct-mapped (DM) cache in conventional cache architectures. In the second logical mapping step (2), every LDM line can be mapped into any of the data line slots of the physical cache 42. However, it is noted that each distinct LDM line can only be mapped into at most one of the slots of the physical cache 42. This is like a fully-associative (FA) cache in conventional cache architectures. In addition, in accordance with the present invention, the cache line slot in the physical cache 42 can be randomly chosen.

In the actual implementation of the present invention, the aforementioned two logical mapping steps are performed in reverse. The n+k bits 16 of FIG. 1 are used (together with the context RMT_ID 18) to select at most one of the LNregs 22 which contain the same contents matching the contents of these n+k bits. Note that exactly one LNreg 22, or none, is selected. If one LNreg 22 is selected, this is called an Index Hit. If none are selected, this is called an Index Miss. If one LNreg 22 is selected (on an Index Hit), then the corresponding selected tag 27 is compared to the tag bits 14 in the address supplied to the cache 10. If this compares as equal (matching), as indicated by the result of comparator 26, and the valid bit V=1, as indicated by the output of the AND gate 28, then this is called a Tag Hit. Otherwise, it is called a Tag Miss. The LDM cache 40 does not physically exist, but is introduced herein to facilitate analysis and discussion of the cache memory 10 of the present invention. The dynamic remapping feature of the present invention enables the cache 10 to store, in physical cache memory 42 (e.g., in the tag and data arrays 24 and 30 of FIG. 2) the most useful $2^n$ lines at run time, rather than holding a fixed set of cache lines and missing others.

To determine which lines in the LDM cache 40 are stored in the physical cache memory 42, each line of the physical cache memory 42 is associated with one of the plurality of LNregs 22. The LNregs 22 store the (n+k)-bit line number of the corresponding logical cache line in the LDM cache 40. Each set of LNregs 22 physically implement a single logical RMT, and changing the line numbers stored in a LNreg 22 maps another logical cache line to the physical cache line. Although FIG. 3 shows $2^n$ cache lines in the physical cache memory 42, as in conventional cache sizes which are always a power of 2, the number of cache lines s of the data array 30 and tag array 24 in the cache 10 (see FIG. 2) of the present invention can be any number (not necessarily a power of 2), so long as s is less than or equal to $2^{n+k}$.

Figure 4:
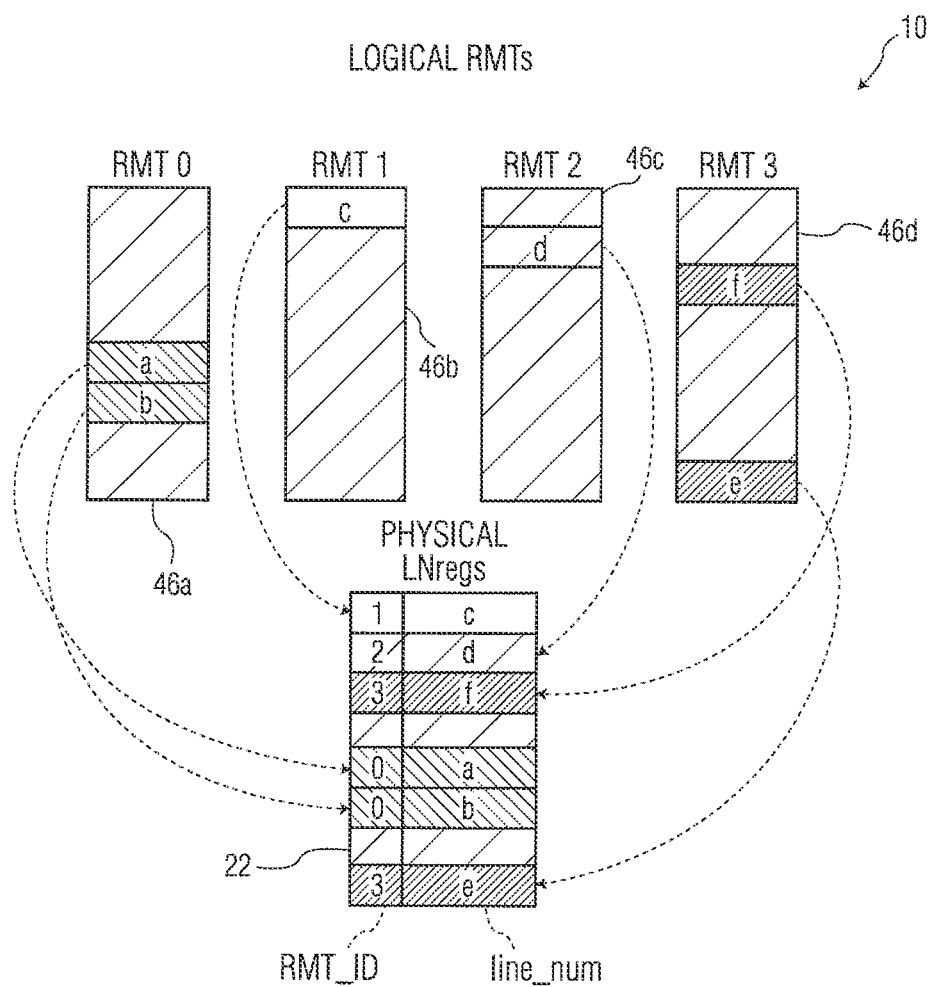
FIG. 4 is a diagram showing sample logical remapping tables according to the present invention.

FIG. 4 is a diagram showing sample Re-Mapping Tables (RMTs) 46a-46d according to the present invention. The RMTs 46a-46d are programmable, and store desired memory-to-cache mappings. The contents of their table entries can be changed dynamically at runtime. For security as well as performance reasons, it is desirable to have multiple mappings, each of which may be used by one or more processes. As can be seen, multiple RMTs can be physically implemented with one set of LNregs 22. This is because, at any time, for each physical cache line that stores a logical cache line, only the entry of the RMT associated to the logical cache line needs to be stored in the LNreg 22. To distinguish which RMT 46a-46d the entry in an LNreg 22 belongs to, an RMT_ID field is included in each LNreg 22, in addition to a line_num field. The RMT_ID field is d bits in length (as shown in FIG. 2), and the line_num field is n+k bits in length. Also, the context RMT_ID field identifies a hardware context, i.e., it specifies a specific RMT to be used by a process.

A process that needs to be protected against information leakage from other processes should use a different RMT. In such circumstances, the operating system (or hyperviser or other trusted system software of a computer system in which the cache 10 of the present invention is implemented, such as the computer system 48 shown in FIG. 1 and described above) is in charge of associating a process with an RMT_ID when the process is assigned a hardware context for execution. Also, it is noted that the LNregs 22 of FIG. 2 could be integrated into the address decoder 20 and the decoder 20 activates cache line 33, if the contents in LNreg, matches the context RMT_ID 18 and the n+k index bits 16 of the memory address supplied to the cache. The LNregs are updated when cache line replacements occur, and a new line's context RMT_ID and index bits are written to the RMT_ID field and line_num field of a selected LNreg, respectively.

Figure 5A:
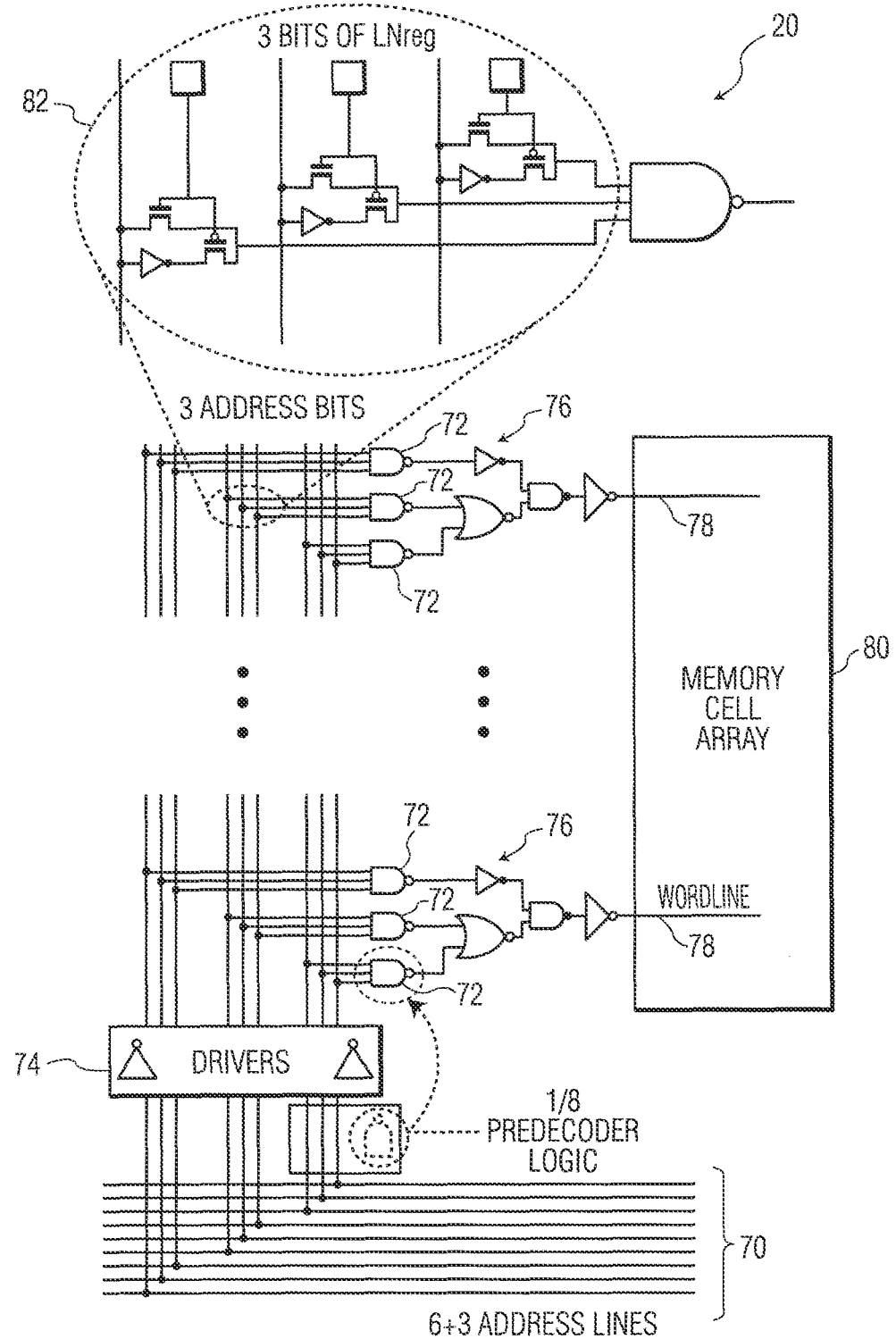
FIGS. 5A-5F are schematic diagrams showing hardware implementations of the decoder circuit of the cache memory of the present invention, as well as timing path simulations.

FIG. 5A is a schematic diagram showing one implementation of the decoder circuit 20 of the cache memory 10 of the present invention. The decoder circuit 20 performs an associative search of the LNregs 22 of FIG. 2, looking for a match of the contents of an LNreg 22 to the index bits 16 and the context RMT_ID 18 (n+k+d bits in total) of the address supplied to the cache. The address decoder 20 receives the index and context RMT ID bits using address lines 70, and includes predecoder logic 72, drivers 74, wordline circuits 76 (each of which outputs a wordline 78), and address bit circuitry 82 (of which 3 bits of LNreg 22 are shown in FIG. 5A). Additionally, one memory cell array 80 is shown, and represents either the data array 30 or the tag array 24 shown in FIG. 2. The address decoder logic of FIG. 5A either selects a single wordline 78 in memory cell array 80, or it does not select any wordline in the memory cell array 80, depending on whether there is an Index Hit or an Index Miss 34, respectively.

The circuitry shown in FIG. 5A integrates comparison logic into a traditional address decoder, making use of the existing logic and routing of the traditional address decoder and maintaining similar timing characteristics. To implement the dynamic memory-to-cache mapping of the present invention, the logic in a traditional address decoder that generates word line selection signals are made flexible using switches. The switches can be controlled, by the values of bits in an LNreg, to connect different address bits, or their inverted values, to the inputs of the logic gates as shown in expanded circuitry 82, thus making the logic flexible. This implements the dynamic memory-to-cache mapping of the present invention.

In the circuitry shown in FIG. 5A, the connections between the address lines and the inputs of the decoder are controlled. The predecoders 72 are moved from the location in a conventional Direct-Mapped cache's address decoder circuit (shown in phantom in FIG. 5A as dotted gates) to the locations shown in FIG. 5A. The predecoders 72 are 3-input NAND gates, and control which cache line is activated given an index.

It is assumed that the LNregs 22 are laid out external to the memory cell array 80. Since each cache line is associated with one LNreg, the overhead of LNregs relative to the overall cache storage is (n+k+d)/M, where n, k, and d are defined as above and M is the total number of memory cells in each cache line including data, tag, flags, and error-correction code (ECC) bits. For example, in a 64 kilobyte (KB) cache with 64-bit address and 64-byte cache line size, n=10. The value of M varies since the numbers of tag, flags, and ECC bits are implementation-dependent. As a rough estimation, it is assumed that there are approximately 50 bits in total for tag, flag, and ECC bits, and therefore, M is approximately equal to 64×8+50=562. If 4 RMTs are allowed, and it is desired to achieve good performance, d=2 and k=4. The relative overhead of storage will be 16/562, which is approximately 2.9%. It is noted that the tag array and the data array may be separated, requiring two sets of address decoders. In such circumstances, the storage overhead will be 5.8%.

It is noted that another way to implement the decoder circuit 20 is by using a content-addressable memory (CAM), such that the LNregs 22 are implemented as a CAM array.

Figure 5B:
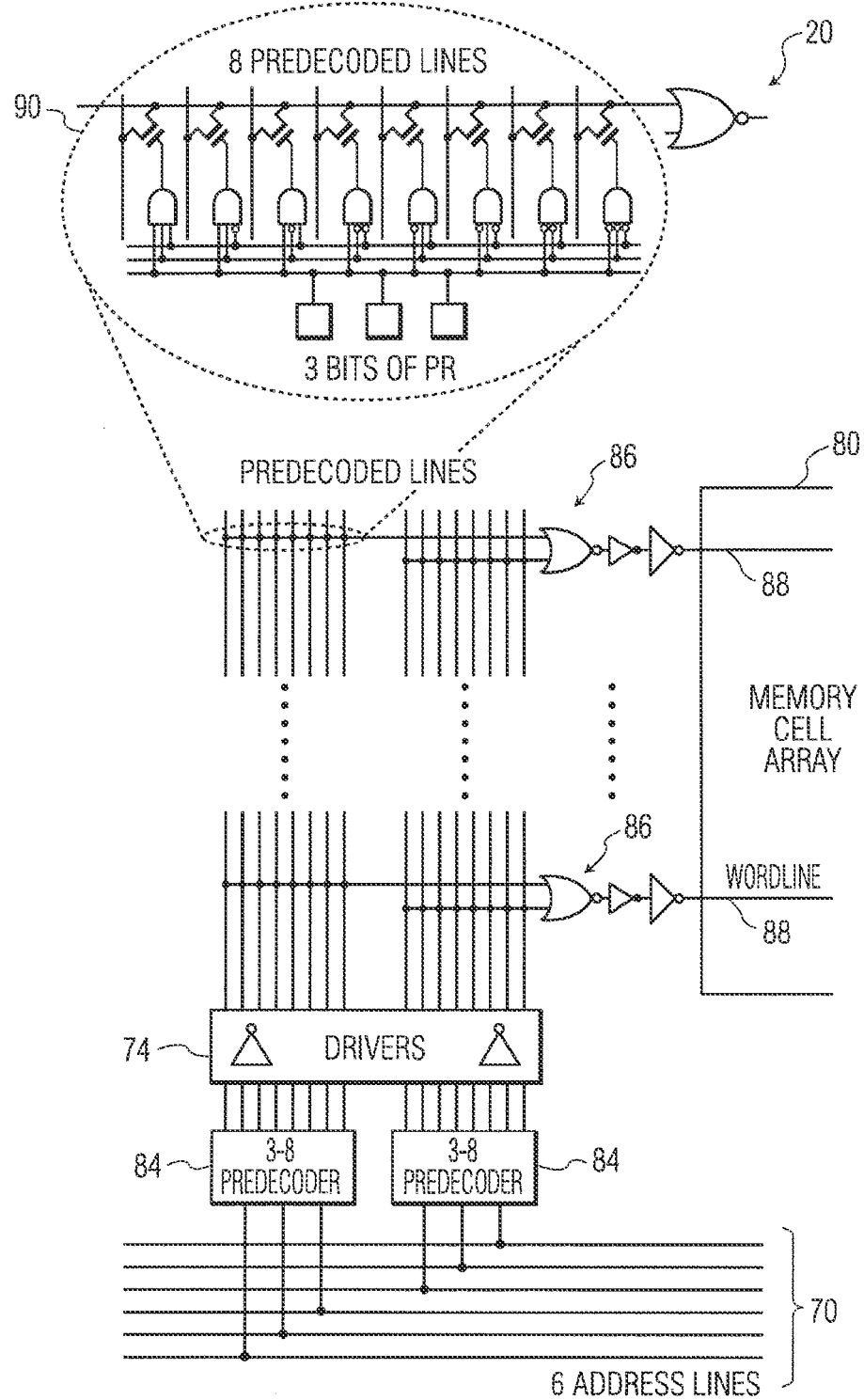

Additionally, the decoder circuit 20 could also be implemented using alternate decoder designs, such as that as shown in FIG. 5B. Similar to the implementation shown in FIG. 5A, the decoder circuit 20 includes address lines 70, and drivers 74. The memory cell array 80 is also shown. Also provided are 3-8 predecoder circuits 84 connected between the address lines 70 and the drivers 74, wordline circuits 86 (which output wordlines 88 to the memory cell array 80), and permutation register (PR) circuitry which includes switches 90. In the implementation shown in FIG. 5B, the static connections in a traditional address decoder between the outputs of the 3-8 predecoder circuits 84 and the final NOR gates in the address decoder are replaced with dynamic connections via switches 90 controlled by the permutation registers. For each switch, a 3-input NAND gate is used to generate a control signal. For every 3 address bits, 8 switches and 8 3-input NAND gates are needed. The more heavily-loaded predecoder lines (due to the drain capacitance of the switches) may be segmented with duplicated drivers.

The hardware required to support the mapping shown in FIG. 5A can be faster than that in FIG. 5B. The load on the long wires, as well as the input lines of the logic gates that the long wires drive, is also lower, because of fewer switches and smaller switch sizes. Since the cache of the present invention has longer index bits, the output of the 3-input NAND gate corresponding to the extra address bits needs to be ANDed with the output of the NOR gate, as shown in the wordline circuit 76. This is done by replacing the first inverter in the word line buffer string with a 2-input NAND gate. By properly adjusting the transistor sizes of the 2-input NAND gate, no extra delay is introduced.

Figure 5C:
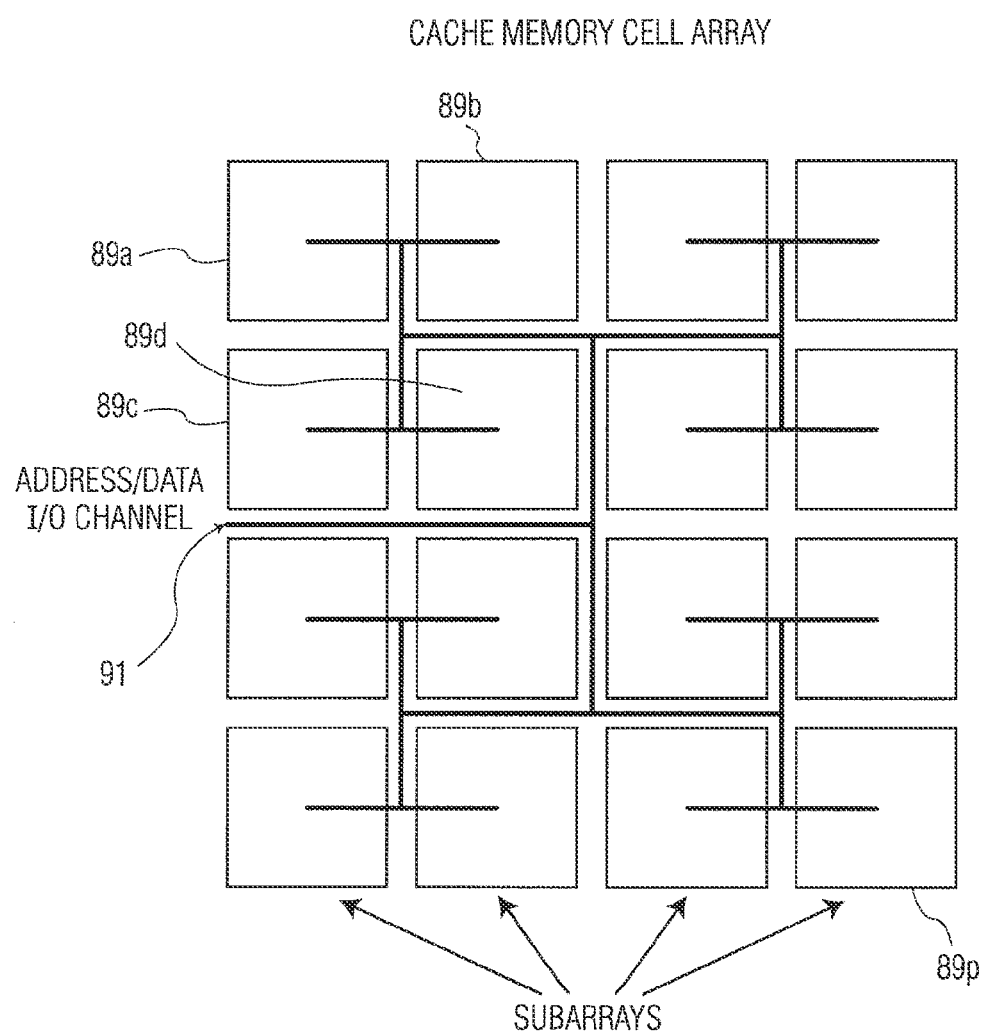
Figure 5D:
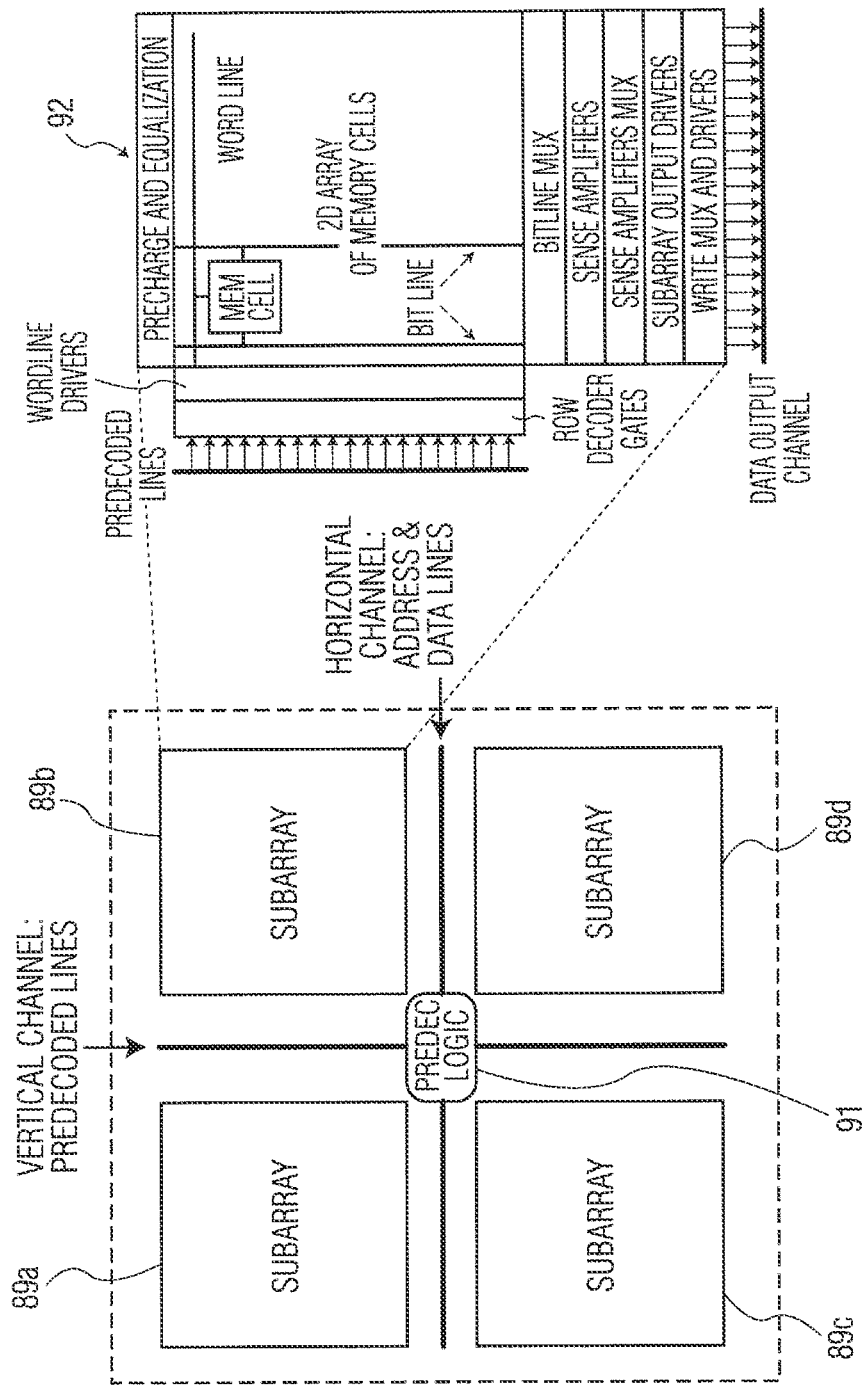

FIGS. 5C-5D are diagrams showing additional details of the layout of the cache memory discussed above. This layout includes a plurality of subarrays 89a-89p, p being any desired integer. The decoder of the present invention could be implemented using the physical circuit layout 91 (connected to an address/data channel). As can be appreciated, the physical layout 91 is compact. Each of the subarrays 89a-89p include standard circuitry 92, including, but not limited to, predecoded lines, row decoder gates, wordline drivers, memory array cells, bitline multiplexers, sense amplifiers, sense amplifiers multiplexers, subarray output drivers, and write multiplexers and drivers.

Table 1 below shows HSPICE results for the address decoder of a traditional direct-mapped cache versus the cache of the present invention (referred to herein as "Newcache"). In all cases, the extra delays are no greater than 5 ps, which is less than 3% of the address decoder time shown in Table 1.

TABLE 1

|  | 8 KB | 16 KB | 32 KB | 64 KB |
| --- | --- | --- | --- | --- |
| Traditional DM cache | 0.149 ns | 0.149 ns | 0.226 ns | 0.192 ns |
| Newcache | 0.151 ns | 0.151 ns | 0.230 ns | 0.197 ns |

Since the overall cache access time is between 600 ps (for the 8 KB cache) to 800 ps (for the 64 KB cache), this increase in address decoder time is less than 1% of the overall cache access time.

Figure 5E:
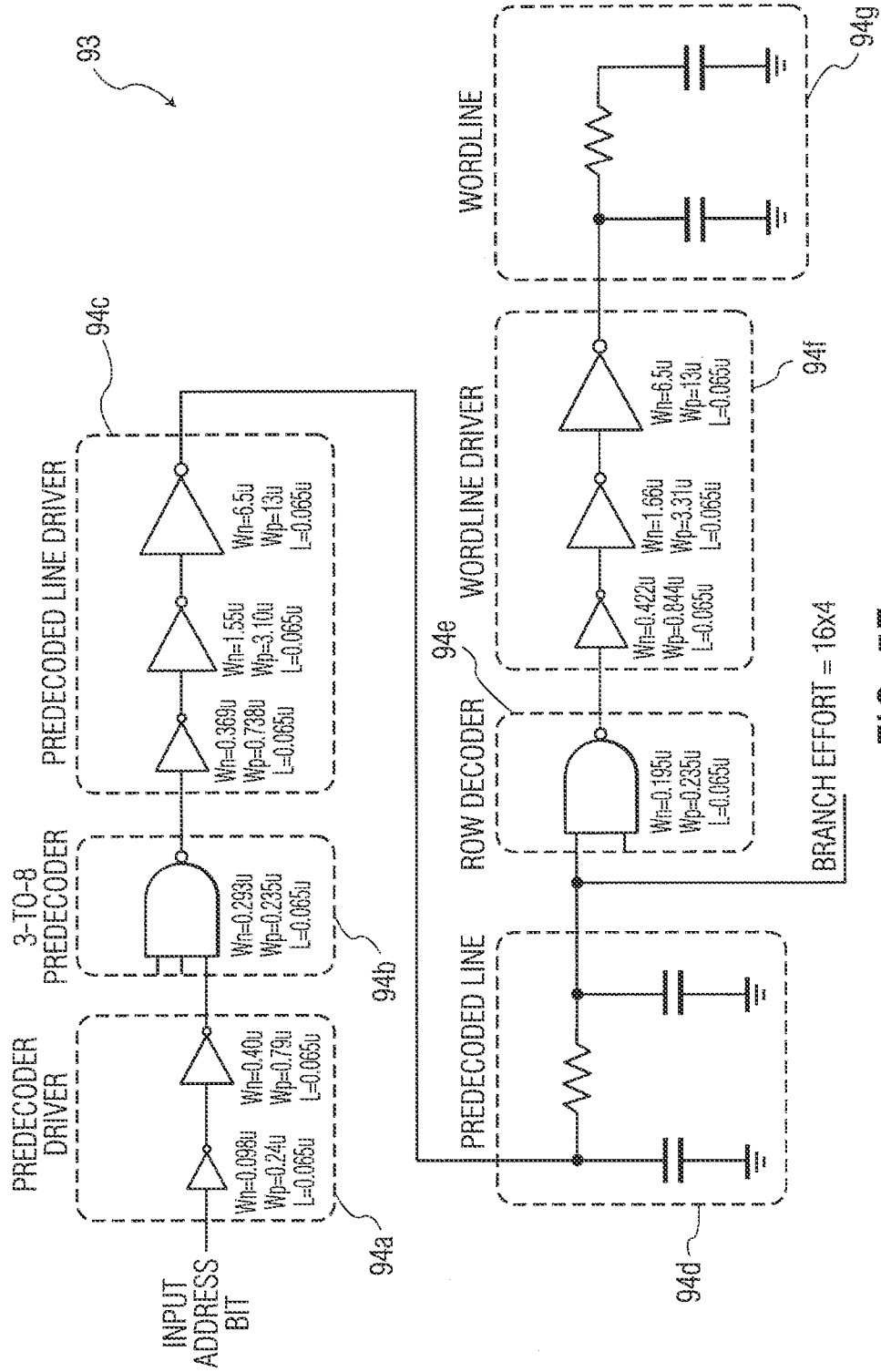
Figure 5F:
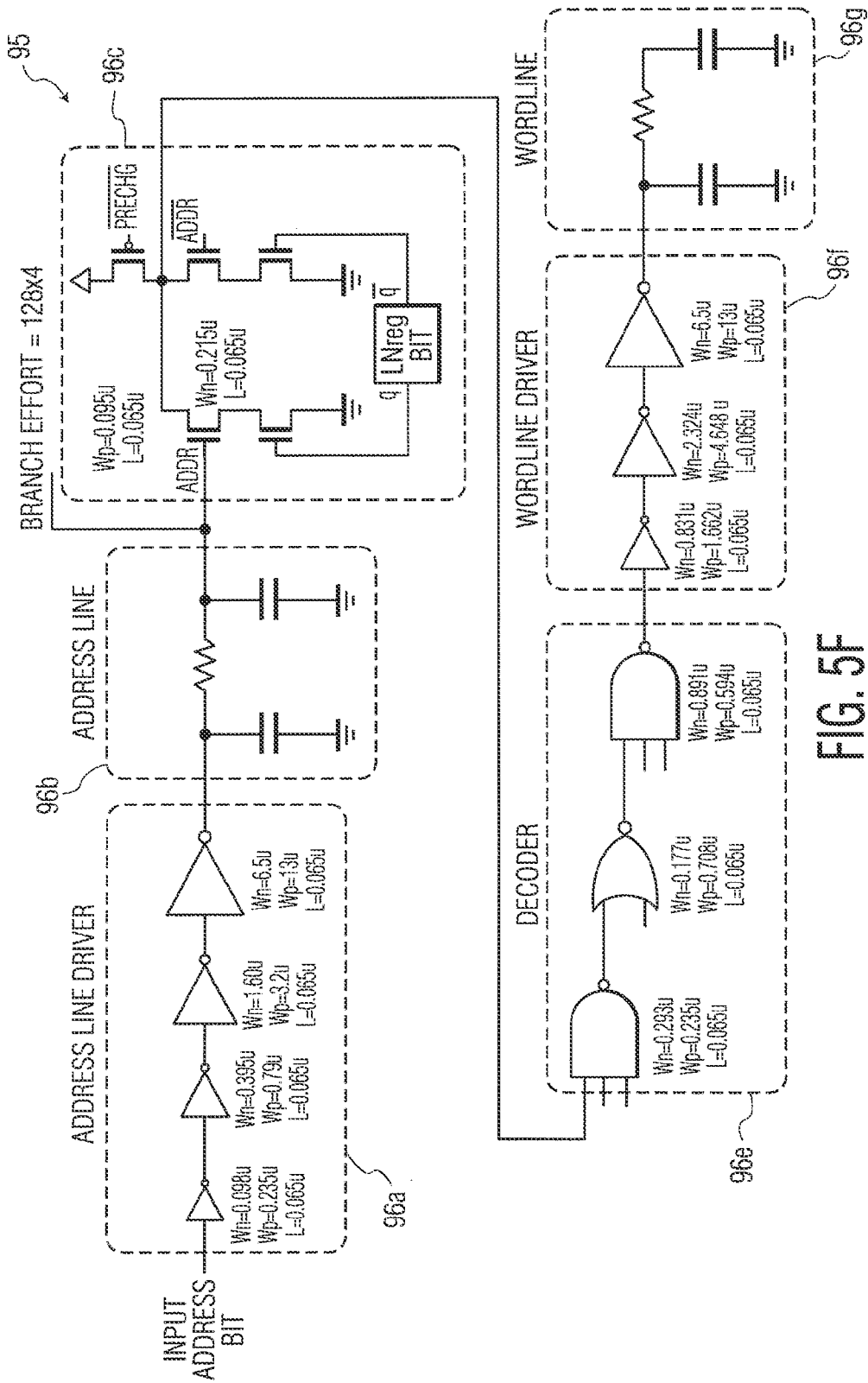

FIG. 5E shows the critical timing path 93 of one implementation of a conventional address decoder for a direct-mapped (DM) cache. It corresponds to the latency numbers given in the first row of Table 1. The timing path 93 includes predecoder driver stage 94a, 3-to-8 predecoder stage 94b, predecoder line driver stage 94c, predecoded line stage 94d, row decoder stage 94e, wordline driver stage 94f, and wordline stage 94g. FIG. 5F shows the equivalent critical timing path 95 of one implementation of the Newcache address decoder for a 64 KB Newcache. It corresponds to the latency numbers given in the second row of Table 1. The path 95 includes address line driver stage 96a, address line stage 96b, Newcache stage 96c, decoder stage 96e, wordline driver stage 96f, and wordline stage 96g. The numbers given below the logic gates for Wn, Wp and L refer to the transistor sizes used in the HSPICE simulation. The capacitances of the Address line and the Wordline in FIG. 5F are set to the same values as that of the Predecoded line and the Wordline in FIG. 5E, respectively. In FIG. 5F, the output of the LNreg bit is available early in the instruction pipeline, and hence does not cause readout delay during the address decoding for a cache access. For the conventional address decoder in FIG. 5E, there are 10 logic gates (8 inverters, one 3-input NAND gate and one 2-input NAND gate), which is comparable to the 10 logic gates (7 inverters, two 3-input NAND gates and one 2-input NOR gate) for the Newcache address decoder in FIG. 5F.

Figure 6:
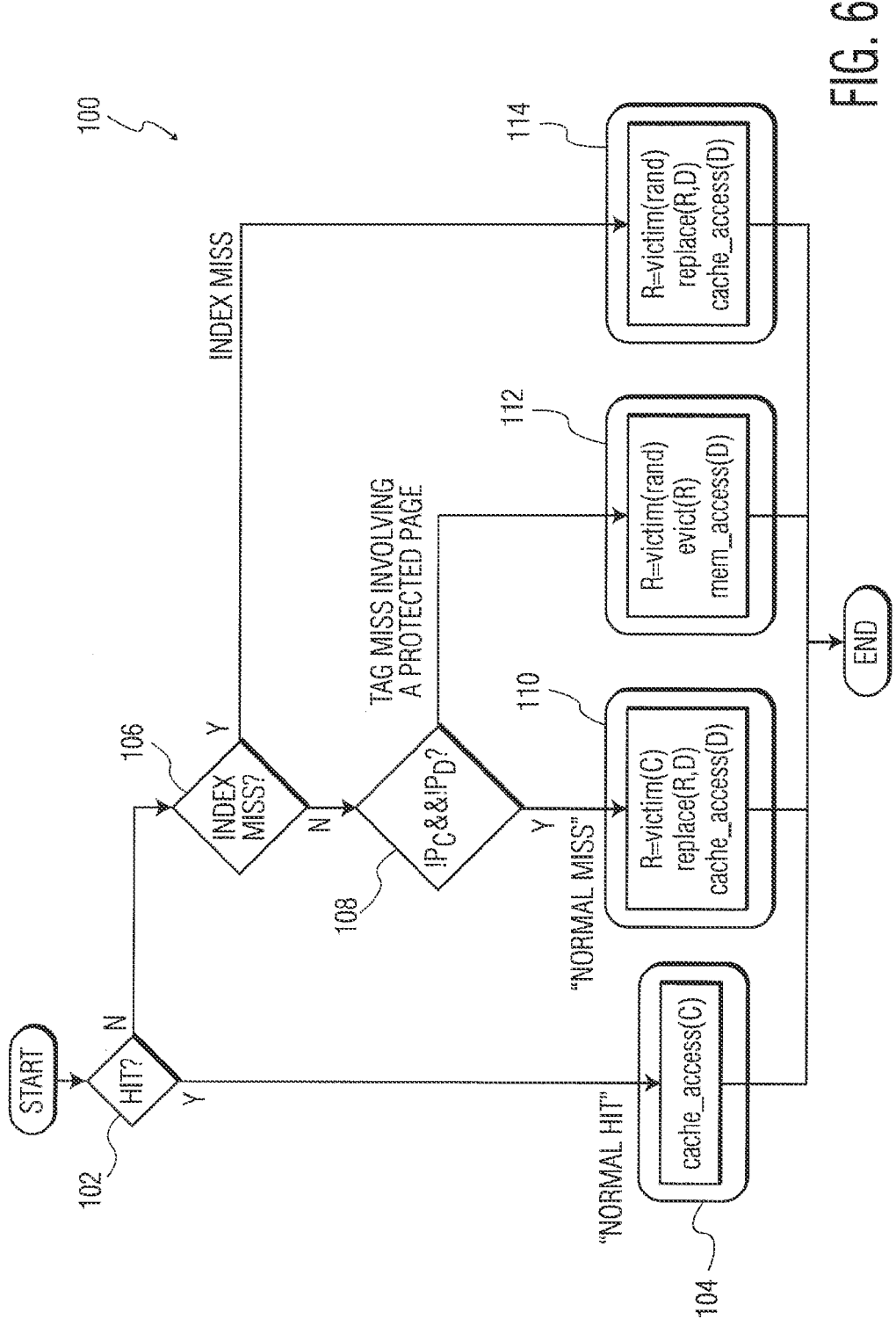
FIG. 6 is a flowchart showing processing steps of a security-aware random cache replacement algorithm according to the present invention.

FIG. 6 is flowchart showing processing steps of a random cache replacement algorithm according to one embodiment of the present invention, indicated generally at 100. Unlike in traditional direct mapped caches, a cache replacement algorithm is necessary in the cache memory of the present invention due to the dynamic remapping. During a cache miss, the replacement algorithm 100 determines which physical cache line should be selected for holding the new logical cache line. Since replacing the logical cache line that the physical cache line holds normally means mapping a new memory address to the physical cache line, the corresponding LNreg 22 (i.e., the physical realization of the logical RMT entry, which stores the corresponding memory-to-cache mapping) of the selected physical cache line needs to be updated accordingly.

There are two types of misses, "index" misses and "tag" misses, in the cache memory of the present invention. An index miss occurs if none of the LNregs 22 matches the given RMT_ID and index. None of the cache lines is selected if an index miss occurs. A tag miss occurs if the index hits in one LNreg 22, but the tag of the selected cache line does not match the address tag. A tag miss essentially is the same as an ordinary miss in a traditional direct-mapped cache, whereas the index miss is a unique type of miss in the cache memory of the present invention. Since an index hit means the match of the context RMT ID and index bits, tag misses only occur within the same process or among processes using the same RMT. Index misses occur early in the hardware pipeline during address decoding, before the tag is read out and compared, and this early miss signal could be used by the pipeline control logic to improve performance. For example, the context RMT ID is known shortly after the Instruction Fetch stage, and an index miss can be detected before even the tag is read out of the tag array 24.

The tag misses are conflict misses in the LDM cache since the addresses of the incoming line and the line in cache have the same index (as well as the same context RMT ID), but different tags. Since, in a direct-mapped cache, at most one cache line can be selected at any time, no two LNregs can contain the same index (and the same context RMT_ID). Therefore, either the original line in the cache is replaced with the incoming line, or the incoming line is not cached.

For index misses, the new memory block can replace any cache line. The nomenclature utilized in the flowchart in FIG. 6 is described in Table 2, below:

TABLE 2

| Notation | Description |
| --- | --- |
| C | The cache line selected by the address decoder (during a cache hit or an index hit but a tag miss). |
| D | The memory block that is being accessed. |
| R | The cache line selected for replacement (victim cache line). |
| Px | The protection bit of X. If X is in a cache line, it is the P bit of the cache line. Otherwise it is determined by the PP bit of the page/segment that X belongs to. |
| cache_access(C) | Access C as in a traditional Direct Mapped cache (and pass it to the processor requesting the memory access and supplying the memory address). |
| victim(C) | Select C as the victim cache line to be replaced. |
| victim(rand) | Randomly select any one out of all possible cache lines with equal probability. |
| replace(R, D) | Replace R with D, update the corresponding LNreg. |
| evict(R) | Write back R if it is dirty; invalidate R (i.e., set V-bit in tag element to "0"). |
| mem_access(D) | Pass D to the processor requesting the memory access (supplying the memory address), without caching it. |

Beginning in step 102, a determination is made as to whether a cache hit has occurred. A cache hit occurs if there is an index hit and a tag hit. If so, step 104 occurs, wherein a cache access operation occurs (as in a traditional direct-mapped cache) on the cache line C selected by the decoder. Otherwise, step 106 occurs, wherein a determination is made as to whether an index miss has occurred. An index miss occurs when the selected cache line C does not match the context RMT_ID and index bits of the memory block D. If an index miss has not occurred, then a tag miss must have occurred at step 106. A tag miss always indicates a matching context RMT_ID, and lines C and D must use the same RMT, which usually means that they belong to the same process, or the same security or trust group. This interference is referred to as internal to a process or processes in the same security group. If a negative determination is made, i.e., an index miss has not occurred, step 108 occurs.

In step 108, a determination is made as to whether neither the incoming line (D) nor the selected line (C) is protected, meaning that the interference is harmless. If so, step 110 occurs, wherein the miss is handled normally as in a traditional cache. Otherwise (if either C or D are protected, meaning that the interference may leak out critical information), step 112 occurs, wherein the cache interference is randomized due to the conflict between C and D. To avoid information-leaking interference, D does not replace C, and since in a tag miss D can not replace cache lines other than C, D is sent directly to the CPU core without being put in the cache. (In an index hit but tag miss, D cannot replace cache lines other than C, because otherwise there will be two LNregs with the same contents.) On the other hand, since a miss should normally cause an eviction, a random line is evicted which "substitutes" for the eviction of C as well as randomizes the interference. Otherwise, the old cache lines tend to stay in the cache and new cache lines will not get cached.

If, in step 106, a determination is made that the miss is an index miss (i.e., it is not a tag miss)—none of the LNregs match the RMT_ID and index of D, step 114 occurs, wherein C and D may or may not belong to the same process, or if they belong to the same process they have different indices. Since for an index miss the new memory block D can replace any cache line, a cache line is randomly selected (with equal probability as in the RAND replacement algorithm) and evicted. The interference caused by an index miss therefore is always randomized.

Compared with other commonly used replacement algorithms such as LRU, pseudo LRU and FIFO, the random replacement algorithm 100 of the present invention requires less hardware cost to implement, due to its stateless nature. It does require a Random Number Generator, which is typically already available in a secure processor. Although the algorithm 100 requires condition checks, these checks are simple and stateless, thus they can be easily implemented with simple combinational logic. Also, the security of the algorithm 100 relies on the quality of the random source, which is preferably a true or pseudo random number generator (TRNG or PRNG) on chip. Further, it is noted that the algorithm 100 could be provided in either hardware (e.g., as a hardwired circuit), firmware, or software (e.g., on one or more computer-readable mediums, such as non-volatile memory, read-only memory (ROM), flash memory, disk, etc.). In the performance statistics discussion below accompanying FIGS. 7-10, the replacement algorithm 100 is assumed to be implemented in hardware.

FIGS. 7-10 are graphs showing performance statistics of the cache memory of the present invention. Generally speaking, the performance of a cache architecture depends on short access times and low miss rates. The CACTI 5.0 program was used to explore the design space of the present invention and to find the optimal access times and power consumption. For testing purposes, the code corresponding to the address decoder was modified to model the logic shown in FIG. 6. More accurate transistor level simulation was also performed using the HSPICE program. The transistor netlists corresponding to the circuit used in CACTI were constructed with the 65 nm Predictive Technology Model (PTM). To accurately model the long wires in the decoder circuitry, the parameters of long wires were manually extracted based on the geometrical information generated by CACTI. The focus was on fast L1 caches, since these are more impacted than L2 and L3 caches.

Figure 7:
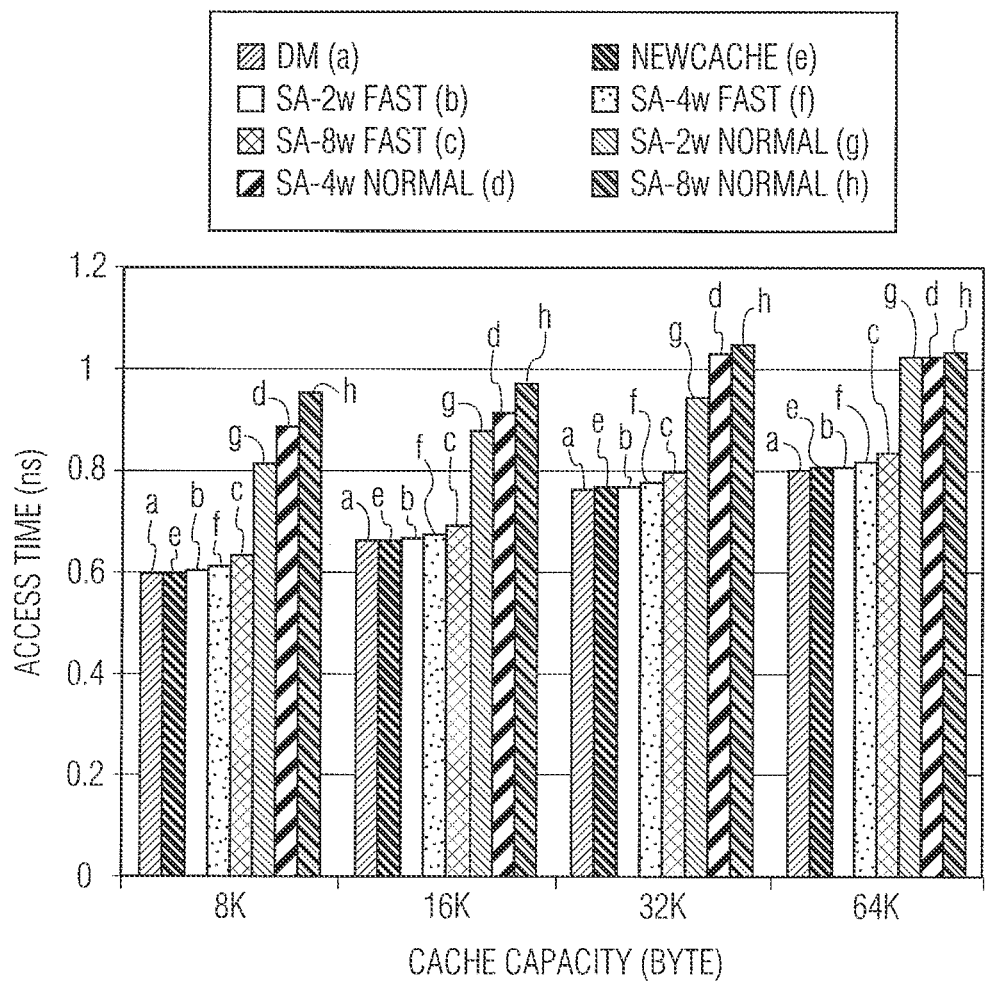
FIGS. 7-10 are graphs showing performance statistics of the cache memory of the present invention.

FIG. 7 shows the results on overall cache access time generated by CACTI. The extra delay introduced by the present invention (referred to in FIG. 7 and hereinbelow as "Newcache"), is always within 1% range of the access time of a traditional direct-mapped (DM) cache. Also compared were the access times of commonly used set-associative (SA) caches that are 2-way, 4-way or 8-way set-associative. The "fast" SA caches are optimized for speed whereas the "normal" SA caches are optimized for both speed and power efficiency. The data were generated by configuring CACTI with fast mode and normal mode, respectively.

Figure 8:
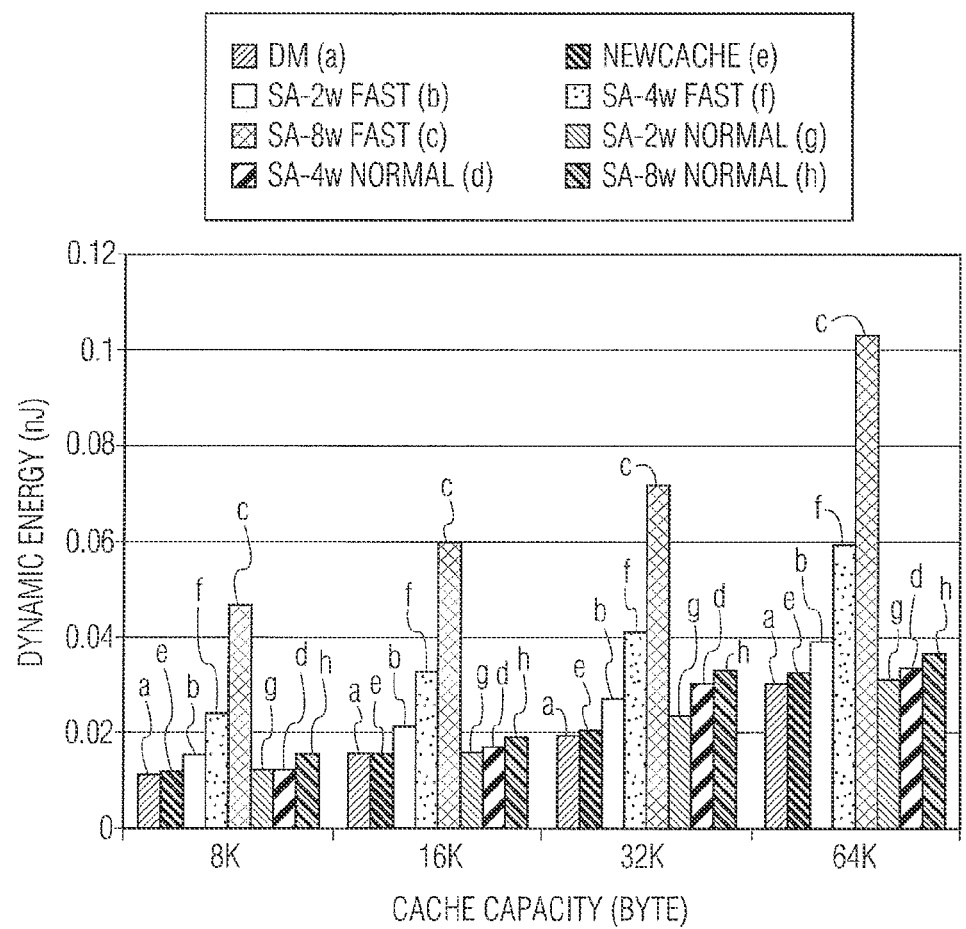

Additionally, the detailed HSPICE simulations described above in connection with Table 1 and FIGS. 5E-5F show that the address decoder of the present invention is no more than 3% of the conventional Direct Mapped cache, and no more than 1% of the overall cache access time. Although a fast SA cache could have an access time close to that of the present invention, the power consumption is significantly higher—up to 4 times higher than Newcache, as shown in FIG. 8.

Cache misses have been classified as compulsory misses, capacity misses, or conflict misses. Compulsory misses (e.g., on a cold start) are common to all caches. Capacity misses (e.g., when the program's working size exceeds the size of the cache) only depend on cache size. Conflict misses have been shown to depend on the cache organization (e.g., set-associativity) and capacity. To reduce conflict miss rate, a traditional way is to increase associativity. However, this impacts cache access time and power efficiency. Increasing capacity can reduce capacity misses as well as conflict misses. However, this is often not feasible in practice due to the limited silicon real estate budget.

As demonstrated by the present invention, conflict misses can be largely independent of cache capacity. Regardless of the real capacity of the physical cache 42 in FIG. 3, the Newcache with an (n+k)-bit index has less conflict misses than a traditional direct-mapped cache with $2^{n+k}$ cache lines, thereby providing enhanced performance over known cache designs. The total number of misses in Newcache has the following bounds:

$$|\text{Miss}(\text{Newcache},2^n)| \leq |\text{CompulsoryMiss}| + |\text{CapactiyMiss}(2^n)| + |\text{ConflictMiss}(DM,2^{n+k})| \qquad \text{Equation 1}$$

$$|\text{Miss}(\text{Newcache},2^n)| \geq \max\{|\text{Miss}(DM,2^{n+k})|, |\text{Miss}(FA,2^n)|\} \qquad \text{Equation 2}$$

where Miss(Arch, Size) denotes the set of misses in a cache of type "Arch" with a capacity of "Size" and |A| is the number of elements in set A. In Equation 1 above, the left side of the equation can be decomposed to the same first 2 terms as the right side plus a third term: ConflictMiss (Newcache,$2^n$). Hence, Equation 1 shows that the conflict misses of Newcache is less than or equal to that of a direct-mapped cache with $2^{n+k}$ cache lines. Indeed, as verified below, this bound is asymptotically tight and is a good approximation of the true miss rate in real configurations. This means that the conflict misses of Newcache are largely independent of its actual cache capacity. The conflict misses are indeed dependent on the size of the larger LDM cache, $2^{n+k}$, rather than on the actual physical cache size, $2^n$. This property of the cache of the present invention gives cache designers the ability to control the conflict miss rate at the desirable level by choosing the proper number of index bits, while choosing the capacity independently based on cost or other needs. This avoids the speed and power penalty due to higher associativity and allows finer-grained control on allocating capacity to the cache and making the best use of the resource.

Equation 2 shows the lower bound of the miss rate of the Newcache. The Newcache can not have a lower miss rate than a FA cache with the same capacity. Also, since the physical cache is a subset of the LDM cache as shown in FIG. 3, a hit in the physical cache is always a hit in the LDM cache while the opposite is not necessarily true. Therefore, the physical cache always has more misses that the LDM cache does, i.e., the Newcache with $2^n$ cache lines always has more misses that a traditional DM cache with $2^{n+k}$ cache lines. The lower bound of the miss rate of the Newcache with $2^n$ cache lines is therefore the maximum of the miss rate of a FA cache with $2^n$ cache lines and the miss rate of a DM cache with $2^{n+k}$ cache lines.

Figure 9:
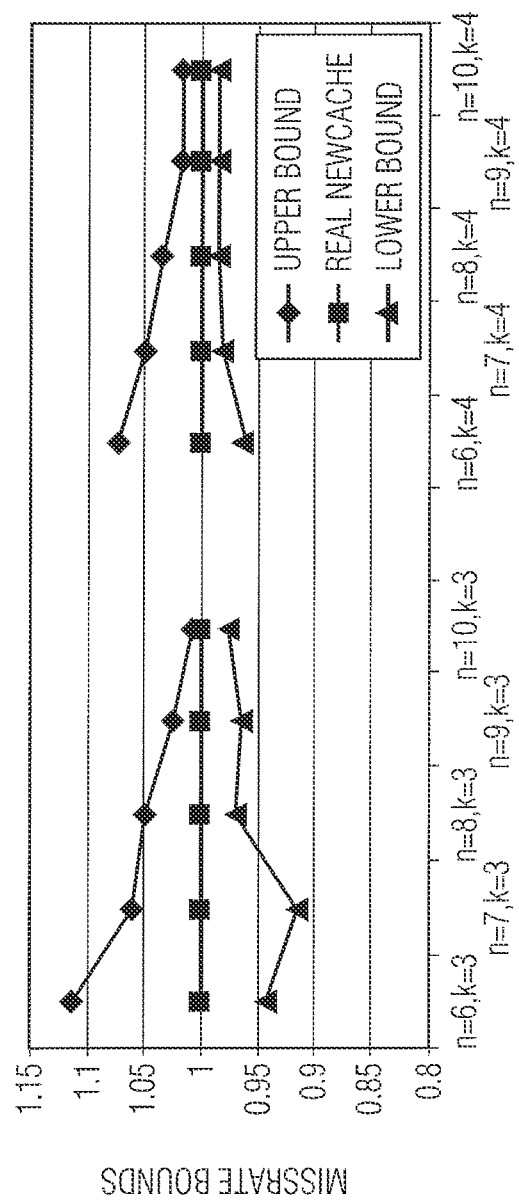

For experimental confirmation of miss rates, Newcache and traditional direct mapped (DM), set-associative (SA) and fully-associative (FA) caches were simulated on a cache simulator derived from sim-cache and sim-cheetah of the simplescalar toolset. All 26 SPEC2000 benchmarks were run for 1 billion instructions with appropriate fast forward counts ranging from 2 million instructions to 3 billion instructions. FIG. 9 illustrates the accuracy of the bounds derived in Equations 1 and 2 above. The bounds are normalized to the real miss rate to show the relative accuracy. The simulation is done for Newcache with 64-byte lines for n=6 to 10 (i.e., 4K bytes to 64K bytes capacity), with cache indices that are k=3 to 4 bits longer. Except for one point, the bounds are always within the 10% range of the real miss rate, and when n+k or k gets larger, the accuracy increases. Indeed, the derived bounds are asymptotically tight, meaning that the equality in Equation 1 holds when k and n+k are large.

Table 3 below compares the miss rates of Newcache with the DM cache and the 2-way and 4-way SA caches with LRU replacement. FA caches and 8-way SA caches with RAND replacement are also included to show the effectiveness of the replacement algorithm of the present invention (discussed above in connection with FIG. 6). The lowest miss rate in each column is highlighted in bold (and normalized to 1 in parenthesis). The miss rates of Newcache is represented in the last 2 rows—Newcache almost always achieves the lowest miss rates achieved in each column by traditional caches.

The power efficiency of Newcache was analyzed with regard to two aspects: the per-access energy of the cache and the overall power consumption. Modern caches are usually organized as a set of subarrays to achieve fast timing and low power dissipation. The main sources of dynamic power include the power for routing address bits in and data bits out via H-trees (as shown by 91 in FIG. 5C), and the power on word lines and bit lines since they are heavily loaded. Since Newcache is direct-mapped, only a minimum number of subarrays need to be activated in each access, which minimizes the power consumed on word lines and bit lines, giving the low per access energy.

pared with the size of the cache and have low switching activities—the contents of LNregs need to be changed only during an index miss. Further, unlike accesses to other memory cells, most accesses to LNregs do not involve power-consuming bit-line charging and discharging. Only writes to LNregs require bit-line operations, which occur only when index misses happen. The increase in leakage power in Newcache is mainly due to the memory cells in LNregs, which is small relative to the overall cache. Hence, the leakage power increase is also very low.

Figure 10:
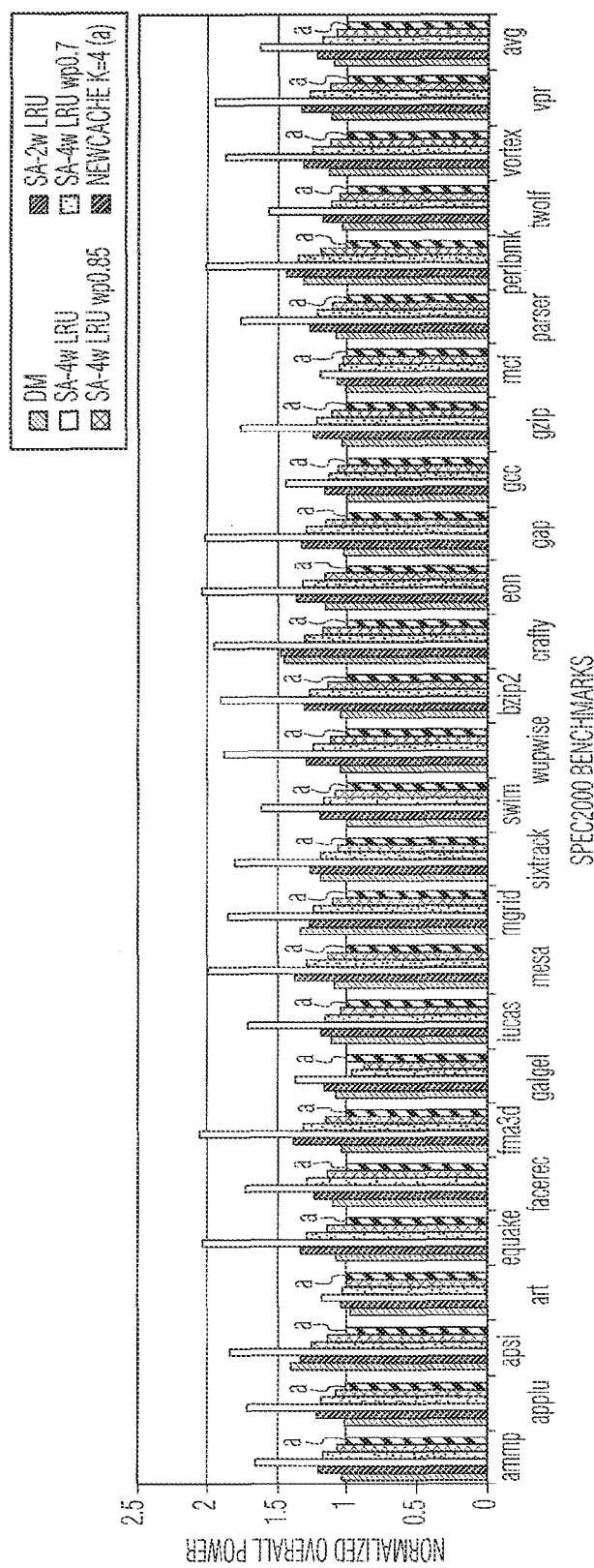

FIG. 10 shows the results comparing the overall power consumption normalized to Newcache. Traditional SA caches are compared, as well as advanced, low-power SA caches—the way-predicting (wp) SA cache. For example, "SA 4w LRU wp0.7" means a 4-way, set-associative, way-predicting cache with prediction accuracy of 0.7, and LRU replacement algorithm. All caches are 32 KB with 64 Byte cache lines. The miss rates of the cache impact the overall system power consumption. A higher miss rate means more accesses to the larger caches or the main memory which consume more power. The cache miss rates were obtained from simulation of all SPEC2000 benchmarks. The power penalty of misses, i.e., the per-access energy of L2 cache was obtained using CACTI 5.0. Newcache is more power efficient than the others due to its low miss rate and low per access energy. The last set of columns show the average over all the benchmarks shown. On average, the 4-way SA cache consumes 61% more power than Newcache, the 2-way SA cache 20% more, the DM cache 8% more, the 4-way way-predicting cache 16% and 6% more with 0.7 and 0.85 accuracy, respectively.

Analysis of the security of the present invention is now discussed. The cache of the present invention adopts the randomization approach on cache misses to mitigate information leakage. This is similar in concept to that used in prior art caches, with some differences for enhancing performance. The information leakage channel is modeled as a classic discrete time synchronous channel. The input symbol of the channel is the line number, i, of the cache line accessed by the victim that would cause an eviction and the output symbol is the line number, j, of cache line for which the attacker observes an eviction. Note that the same physical cache line may have different line numbers from the victim and attacker's points of view (e.g., in the proposed

TABLE 3

|  | 4 KB | 8 KB | 16 KB | 32 KB | 64 KB |
| --- | --- | --- | --- | --- | --- |
| DM | 0.133 | 0.093 | 0.068 | 0.055 | 0.048 |
| SA-2way, LRU | 0.101 | 0.075 | 0.057 | 0.045 | 0.041 |
| SA-4way, LRU | 0.096 | 0.068 | 0.053 (1) | 0.042 (1) | 0.040 (1) |
| SA-8way, RAND | 0.095 | 0.071 | 0.054 | 0.044 | 0.041 |
| FA, RAND | 0.090 (1) | 0.067 (1) | 0.053 (1) | 0.044 | 0.040 (1) |
| Newcache k = 4, SecRAND | 0.093 (1.033) | 0.068 (1.015) | 0.054 (1.019) | 0.044 (1.048) | 0.041 (1.024) |
| Newcache k = 6, SecRAND | 0.090 (1) | 0.067 (1) | 0.053 (1) | 0.044 (1.048) | 0.040 (1) |

FIG. 8 shows the per-access power consumption. It shows the dynamic read energy data generated by CACTI. The impact of the changes on the overall power consumption compared to DM caches is very low—less than 2%. This is because the percent of energy consumed by the modified structures in Newcache is low. The new address decoder (excluding word lines since they are not changed) consumes just a few percent more than a traditional DM cache, and the whole decoder power consumption is normally less than 5% of the overall dynamic power. The LNregs consume little power because they are a small amount of memory comcache, they may use different RMTs). To make the capacity of this channel zero, the randomization should meet the following requirement for all protected cache lines:

$$P(j|i)=P(j'|i), \forall i,j,j' \quad \text{Equation 3}$$

where P(j|i)=Pr(output=j|input=i). In other words, given an access at line i by the victim that would cause an eviction, the attacker can observe an eviction at any line number with equal probability. From the attacker's point of view, although the attacker can observe a cache eviction, he has no idea which cache line was accessed by the victim. Below, it is shown that the cache of the present invention meets this condition. Given a cache miss that causes eviction, the following cases need to be considered:

a) The miss is an index miss. According to FIG. 6, a random cache line R is selected for eviction with equal probability. In other words, for any victim's access that would cause an eviction, all cache lines have the same probability to be evicted, i.e., $P(j|i)=P(j'|i)$, $\forall$ i,j,j'; and b) The miss is a tag miss that involves protected cache lines. As shown in FIG. 6, the line to be evicted is also randomly selected with equal probability, i.e., $P(j|i)=P(j'|i)$, $\forall$ i,j,j'.

Clearly, the randomization feature of the algorithm of the present invention satisfies Equation 3 above, and thus achieves zero channel capacity. Some additional benefits of the cache of the present invention are discussed below:

Fault Tolerance:

Memory-to-cache remapping is a common technique used in fault-tolerant cache design. In traditional caches, a memory block mapped to a faulty line/set is statically remapped to another good line/set. Such schemes increase the number of conflict misses since the remapped cache line/set is now shared by more memory addresses. They also increase the number of capacity misses since the faulty lines reduce cache capacity. The proposed cache architecture can provide fault tolerance in a similar manner using remapping, but with better performance. Due to the dynamic memory-to-cache mapping of the present invention, a cache of size s with p faulty cache lines is equivalent to a cache of size s-p, which has the same conflict miss rate as shown by Equation 1. In other words, faulty cache lines in the cache of the present invention only increase capacity misses, but not conflict misses.

Hot-Spot Mitigation:

Due to spatial and temporal locality, the references to a small number of cache lines account for a majority of the total cache references. The more frequently accessed cache lines generate more heat, causing hot spots. Such unevenly distributed cache line accesses, however, are mostly avoided by the cache of the present invention. This is because the replacement algorithm of the present invention maps memory blocks to randomly selected physical cache lines, which avoids clustering of frequently accessed cache lines.

Optimization for Power Efficiency:

With the ability of mapping memory blocks to arbitrary physical cache lines, the present invention can also facilitate low power design. For example, by adaptively turning off cache lines based on a program's working set, the power efficiency of the cache can be further improved with minimal impact on performance. An analysis similar to that in the discussion of fault tolerance can show that turning off cache lines in the proposed cache will cause fewer additional cache misses than in traditional caches.

Benefits for Cache Partitioning and Locking:

In traditional caches such as set-associative caches, cache partitioning is not trivial and has many restrictions. A set-associative cache can be partitioned in two ways: horizontal partitioning and vertical partitioning. Horizontal partitioning divides cache sets into subgroups, each of which forms a partition. One issue with this scheme is that the number of cache sets in each partition has to be a power of 2. This severely limits the flexibility of choosing a partition size. In addition, the address decoder has to be redesigned so that it can be reconfigured to index different numbers of cache sets. Vertical partitioning partitions cache "ways" (degrees of associativity) into subgroups. As most caches have limited associativity, the number of partitions can be very limited. In addition, the partitions have lower associativity than the original cache, thus incurring higher conflict miss rates.

Cache line locking is a more flexible way to "partition" a cache, as in PLcache. It, however, also suffers from higher conflict miss rates. In a set-associative cache, the locked line(s) in a cache set reduce the effective associativity of the set, thus incurring more conflict misses. In contrast, the cache of the present invention does not have restrictions on the number of physical cache lines in a cache, i.e., the number of cache lines s can be an arbitrary positive integer, unlike in traditional caches where s should be a power of 2. Therefore, cache partitioning and locking mechanisms built upon the cache of the present invention has the highest flexibility in allocating cache lines to a partition. Moreover, as shown above, partitioning a cache incurs fewer additional cache misses in the present invention than in traditional caches, thus providing better performance.

Figure 11:
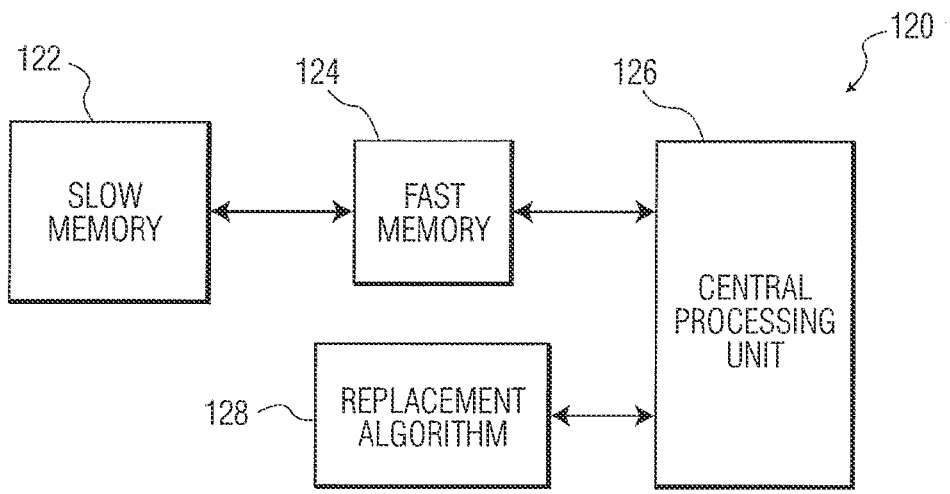
FIG. 11 is a diagram showing the present invention implemented in a computer system having both fast and slow cache memories.

The present invention can also be applied to computer systems having more than one type of memories, such as the computer system 120 shown in FIG. 11. As shown therein, the computer system 120 includes two types of memories, a slow memory 122 and a fast memory 124. The central processing unit (CPU) 126 is in communication with both memories 122, 124, and executes a replacement algorithm 128. The CPU 126 tries to find information in the faster memory 124. If it cannot, it fetches it from the slow memory 122 and uses the replacement algorithm 128 (e.g., one or more of the replacement algorithms discussed herein, or other type of replacement algorithm) to replace some information in the fast memory 124, e.g., if the fast memory 124 is already full. The dynamic remapping described herein is still applicable to prevent information leakage. Additionally, the two-level logical mapping shown in FIG. 3 and discussed above can also be applied to improve the performance of dynamic mapping, if desired. It is also noted that each level of the mapping can also be generalized to set-associative or other mapping (e.g., rather than direct-mapping in the first level of mapping to the LDM cache and fully associative mapping in the second level from LDM cache to physical cache as described above).

Figure 12:
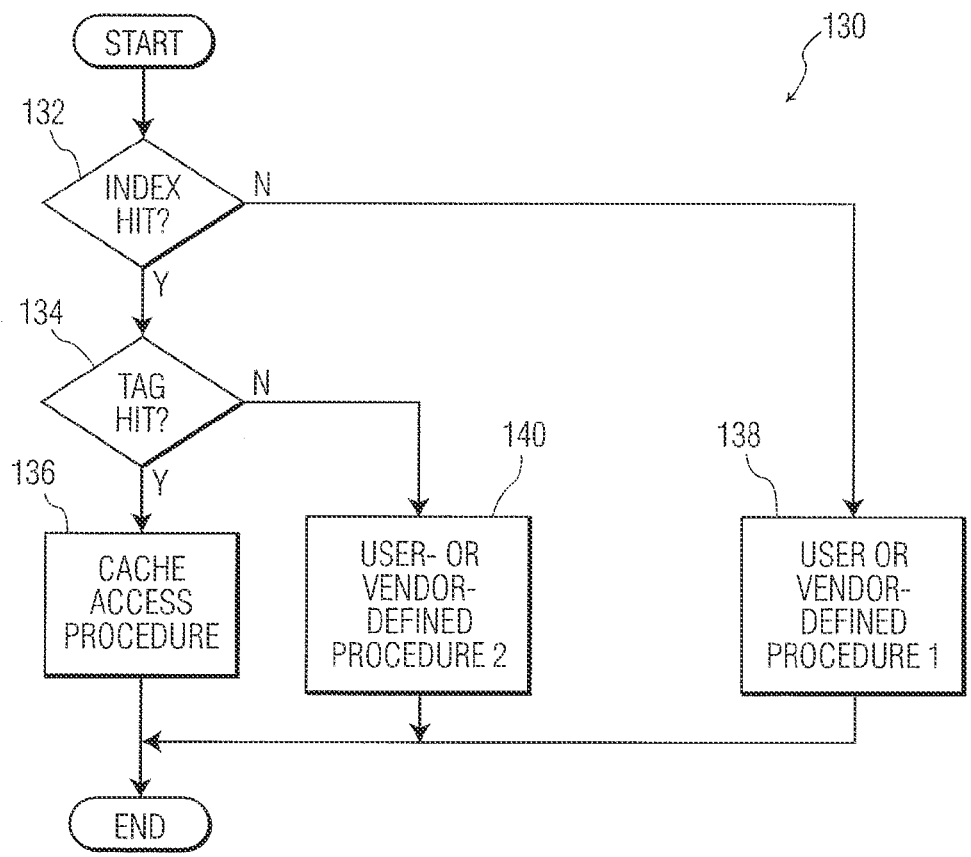
FIG. 12 is a flowchart showing a general cache replacement algorithm according to the present invention.

A generalized version of the replacement algorithm of the present invention, indicated generally at 130, is shown in FIG. 12. In step 132, a determination is made as to whether an index hit occurred. If a positive determination is made, step 134 occurs, wherein a determination is made as to whether a tag hit occurred. If so, step 136 occurs, wherein a cache access procedure is invoked. Such a procedure could include, but is not limited to, directly accessing the line in the cache corresponding to the matching tag.

If a negative determination has been made in step 132, step 138 occurs, wherein a first user- or vendor-defined procedure (procedure 1) is invoked. If a negative determination has been made in step 134, a second user- or vendor-defined procedure (procedure 2) is invoked in step 140. The user or vendor-defined procedures could be any desired procedure for replacing contents in cache memory, such as random replacement (as discussed earlier) or other suitable procedures. The algorithm 130 can be implemented in hardware, or in software for less time-critical caches. For example, the replacement algorithm could be a sequence of instructions in software or in firmware, stored on disk, flash memory or ROM.

Having thus described the invention in detail, it is to be understood that the foregoing description is not intended to limit the spirit or scope thereof. What is desired to be protected is set forth in the following claims.

What is claimed is:

1. A method for accessing data in a cache memory, comprising the steps of:
   receiving a plurality of tag bits and a plurality of index bits at the cache memory;
   processing the plurality of index bits using an address decoder having a plurality of line number registers to identify whether a matching index exists in the plurality of line number registers;
   if a matching index exists in the plurality of line number registers, comparing the plurality of tag bits to a tag of a tag array identified by the matching index to determine if the plurality of tag bits match the tag identified in the tag array; and
   if the plurality of tag bits match the tag identified in the tag array, retrieving a data line from a data array using the matching index.

2. The method of claim 1, further comprising replacing a data line in the cache memory using a first pre-defined procedure if a matching index does not exist in the cache memory.

3. The method of claim 2, further comprising replacing a data line in the cache memory using a second pre-defined procedure if a matching tag does not exist in the cache memory.

4. The method of claim 1, further comprising replacing a random line in the cache memory with a data line from a main memory.

5. The method of claim 1, further comprising determining whether an incoming line and a selected line of the cache memory is protected.

6. The method of claim 5, further comprising storing a new data line from main memory at a pre-defined location in the cache memory determined by a matching index, if a matching tag does not exist in the cache memory, if a matching index exists in the cache memory, and if neither the incoming line nor the selected line of the cache memory are protected.

7. The method of claim 5, further comprising erasing a randomly-selected location of the cache memory if a matching tag does not exist in the cache memory, if a matching index exists in the cache memory, and if either the incoming line or the selected line of the cache memory is protected.

8. A non-transitory computer-readable medium for use with a cache memory, the computer-readable medium having instructions stored thereon which, when executed, cause a cache memory to access data in the cache memory by performing the steps of:
   receiving a plurality of tag bits and a plurality of index bits at the cache memory;
   processing the plurality of index bits using an address decoder having a plurality of line number registers to identify whether a matching index exists in the plurality of line number registers;
   if a matching index exists in the plurality of line number registers, comparing the plurality of tag bits to a tag of a tag array identified by the matching index to determine if the plurality of tag bits match the tag identified in the tag array; and
   if the plurality of tag bits match the tag identified in the tag array, retrieving a data line from a data array using the matching index.

9. The non-transitory computer-readable medium of claim 8, wherein the computer-readable medium instructs the cache memory to replace a data line in the cache memory using a first pre-defined procedure if a matching index does not exist in the cache memory.

10. The non-transitory computer-readable medium of claim 9, wherein the computer-readable medium instructs the cache memory to replace a data line in the cache memory using a second pre-defined procedure if a matching tag does not exist in the cache memory.

11. The non-transitory computer-readable medium of claim 8, wherein the computer-readable medium instructs the cache memory to replace a random line in the cache memory with a data line from a main memory.

12. The non-transitory computer-readable medium of claim 8, wherein the computer-readable medium instructs the cache memory to determine whether an incoming line and a selected line of the cache memory is protected.

13. The non-transitory computer-readable medium of claim 12, wherein the computer-readable medium instructs the cache memory to store a new data line from main memory at a pre-defined location in the cache memory if a matching tag does not exist in the cache memory, if a matching index exists in the cache memory, and if neither the incoming line nor the selected line of the cache memory are protected.

14. The non-transitory computer-readable medium of claim 12, wherein the computer-readable medium instructs the cache memory to erase a randomly-selected location of the cache memory if a matching tag does not exist in the cache memory, if a matching index exists in the cache memory, and if either the incoming line or the selected line of the cache memory is protected.

* * * * *